United States Patent
Stevens

(10) Patent No.: US 11,141,821 B2
(45) Date of Patent: Oct. 12, 2021

(54) AUTOMATED SCREW DRIVING MACHINE

(71) Applicant: Mark Stevens, Lexington, OH (US)

(72) Inventor: Mark Stevens, Lexington, OH (US)

(*) Notice: Subject to any disclaimer, the term of this patent is extended or adjusted under 35 U.S.C. 154(b) by 335 days.

(21) Appl. No.: 16/233,658

(22) Filed: Dec. 27, 2018

(65) Prior Publication Data
US 2019/0240790 A1 Aug. 8, 2019

Related U.S. Application Data

(60) Provisional application No. 62/611,614, filed on Dec. 29, 2017.

(51) Int. Cl.
*B23P 19/00* (2006.01)
*B23P 19/06* (2006.01)
*B65G 47/12* (2006.01)
*B65G 47/256* (2006.01)

(52) U.S. Cl.
CPC ........... *B23P 19/002* (2013.01); *B23P 19/004* (2013.01); *B23P 19/006* (2013.01); *B23P 19/06* (2013.01); *B65G 47/12* (2013.01); *B65G 47/256* (2013.01)

(58) Field of Classification Search
CPC ..... B23P 19/001; B23P 19/002; B23P 19/004; B23P 19/006; B23P 19/06; B65G 25/02; B65G 25/04; B65G 27/04; B65G 47/12; B65G 47/18–20; B65G 47/256; B65G 47/82
See application file for complete search history.

(56) References Cited

U.S. PATENT DOCUMENTS

| | | | | |
|---|---|---|---|---|
| 3,710,922 A | * | 1/1973 | Lanphere | B65G 47/256 198/395 |
| 4,602,537 A | * | 7/1986 | Dixon | B23P 19/006 81/430 |
| 5,291,645 A | * | 3/1994 | Aoyama | B23P 19/006 29/240 |
| 8,479,382 B2 | * | 7/2013 | Sarh | B21J 15/142 29/809 |
| 9,079,275 B2 | * | 7/2015 | Ota | B23P 19/005 |
| 2006/0185149 A1 | * | 8/2006 | Erdman | B23P 19/004 29/525.01 |
| 2009/0255779 A1 | * | 10/2009 | Schmidt | B23P 19/004 198/383 |
| 2012/0067176 A1 | * | 3/2012 | Ota | B25B 23/08 81/57.37 |

FOREIGN PATENT DOCUMENTS

CN 105750865 A * 7/2016

OTHER PUBLICATIONS

Translation of CN-105750865-A (Year: 2016).*

* cited by examiner

*Primary Examiner* — Matthew P Travers
(74) *Attorney, Agent, or Firm* — Sand, Sebolt & Wernow Co., LPA

(57) ABSTRACT

An automated screw driving machine may include a hopper adapted to hold associated fasteners, a chuck assembly adapted to hold an individual fastener in position with respect to an associated component part, a feeder assembly adapted to convey the fasteners from the hopper to the chuck assembly; and, a driver assembly that takes fasteners from the chuck assembly and attaches them to the associated component part.

18 Claims, 40 Drawing Sheets

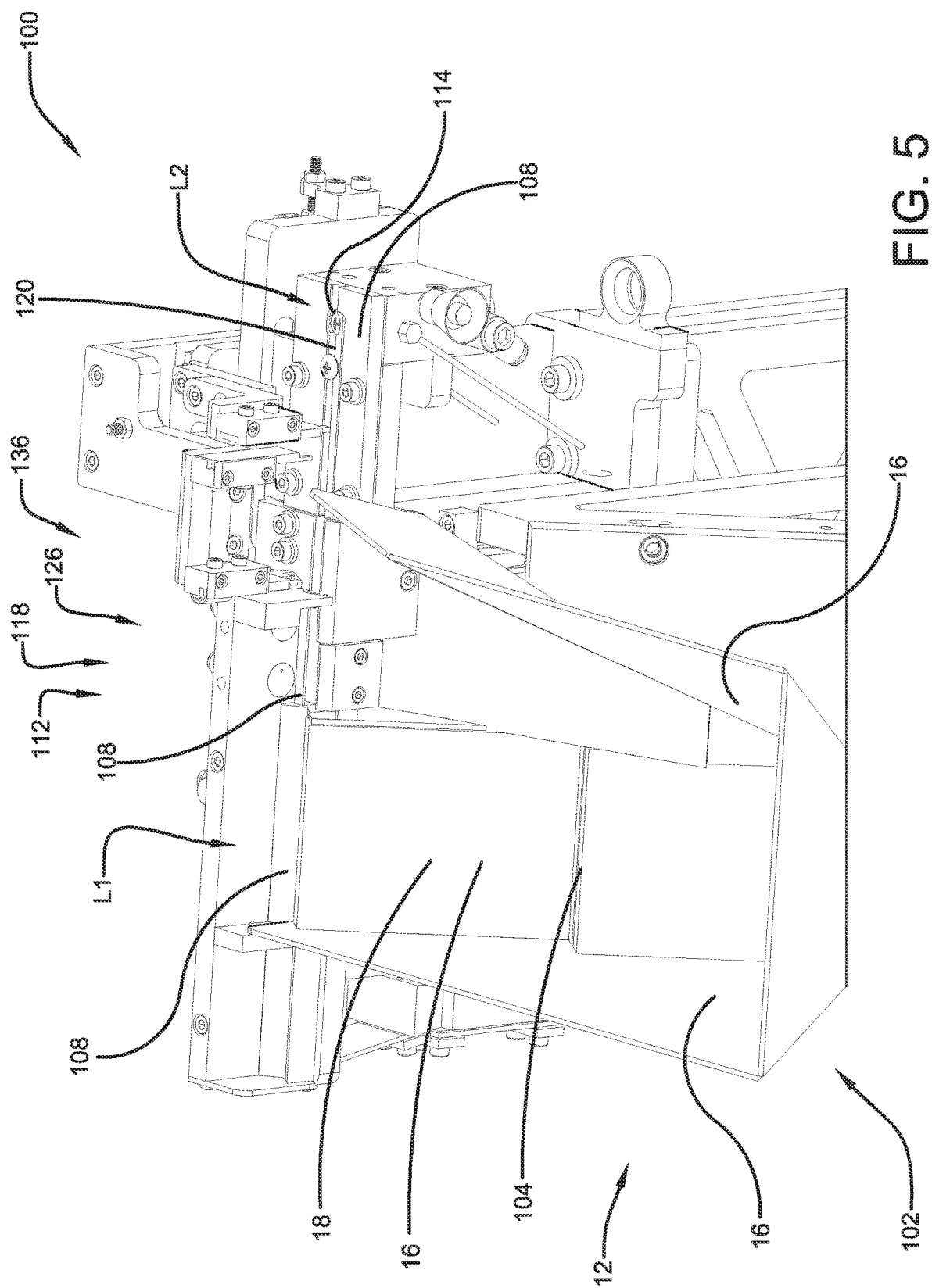

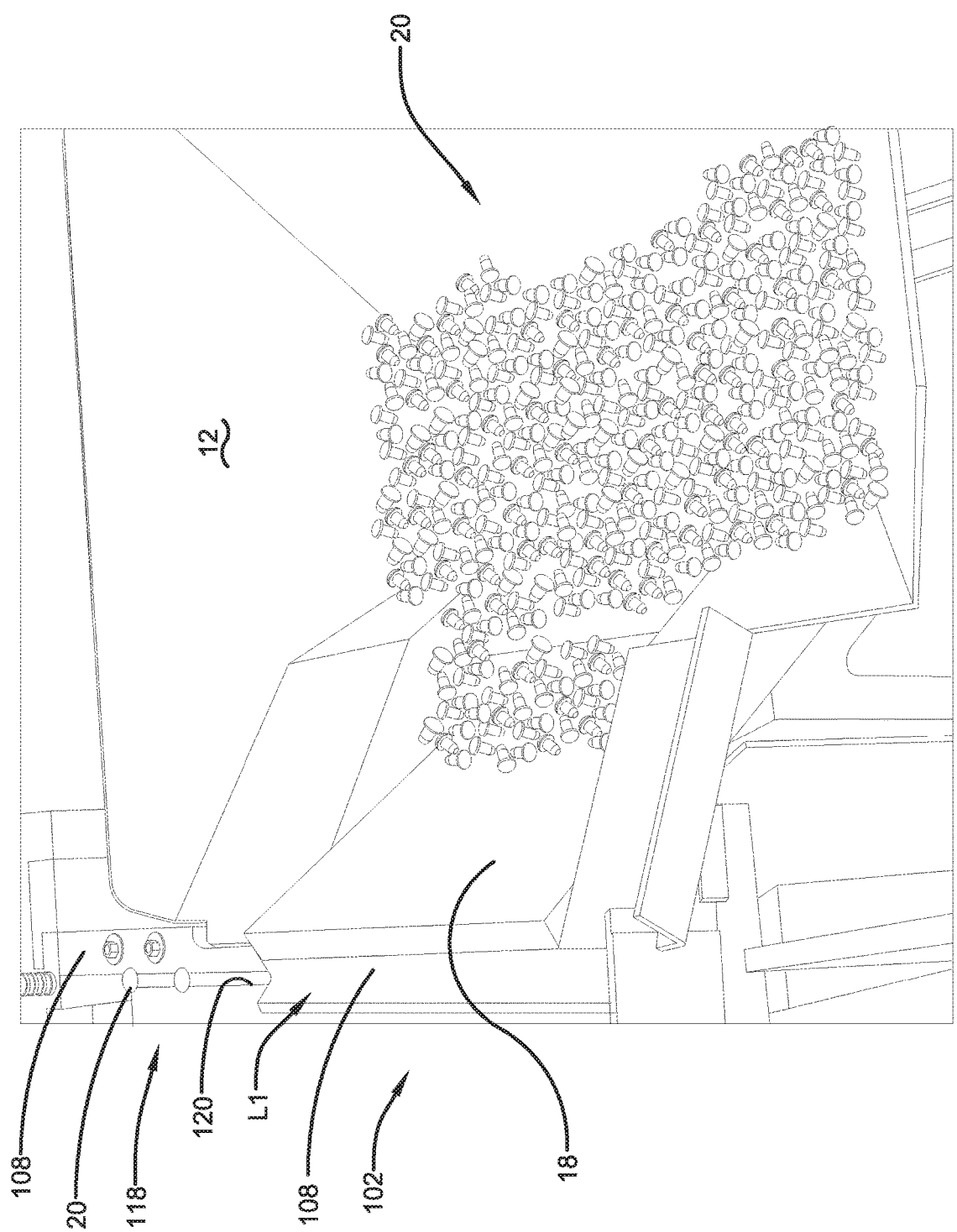

AUTOMATED SCREW DRIVING MACHINE

CROSS-REFERENCE TO RELATED APPLICATION

This application claims priority to U.S. Provisional Patent Application No. 62/611,614, entitled AUTOMATED SCREW DRIVING MACHINE, filed Dec. 29, 2017, which is incorporated herein by reference.

BACKGROUND

A. Field of the Invention

This invention generally concerns apparatuses and methods related to automated screw driving machines.

B. Description of Related Art

It is well known in the manufacturing industry to use automated screw driving machines that automatically attach screws or other fasteners to various types of component parts in order to fasten or attach such component parts together. Automated screw driving machines typically include a storage container or hopper which holds fasteners to be used, a clamp or chuck assembly which holds individual fasteners in position with respect to the component part, a feeder assembly that conveys the fasteners from the hopper to the chuck, and a driver assembly that takes the fastener from the chuck and attaches it, typically with both linear and torsional forces, to the component part. While many known automated screw driving machines work adequately for their intended purpose, they are known to have several problems and limitations.

One problem with known screw driving machines is that fasteners often get stuck or jammed. This problem may occur anywhere throughout the process but is especially common with known feeder assemblies and chuck assemblies. Another common problem is that too many or too few fasteners are delivered to the chuck assembly. While known feeder assemblies use sensors in an effort to detect the presence of fasteners, they are typically unreliable.

Other known problems are related to chuck assemblies. Often the final stages of fastener placement within the chuck is accomplished using only gravity. This leads to fasteners "falling" into the chuck in a misaligned position. Another known problem comes when a component part requires two or more different sized or shaped fasteners to be used with the same driver assembly. To accommodate the different fasteners, the chuck size and shape is compromised to an in-between or average arrangement. This leads to fasteners being misaligned within the chuck and/or to chucks being incapable of holding some fasteners at all.

Other known problems are related to driver assemblies. Often during typical manufacturing conditions, driver assemblies are bumped or knocked. These forces can cause the driver assembly to become misaligned with respect to the chuck and/or with respect to the component part. Another known problem occurs when the component part at issue is relatively delicate. In these conditions it may be a requirement that the driver assembly cannot physically contact the component part. This increases the difficulty in properly attaching fasteners to the component part.

The problems just described, and many similar such problems, lead to manufacturing delays for the machine operator and often to requirements that the screw driving assembly be shut down for maintenance so that the problem can be remedied. Many times these problems also lead to the requirement that the corresponding component part be discarded. Thus, known screw driving machines have problems that lead to production inefficiencies, equipment shut downs, and unfit components. The resultant increases in costs and waste are undesirable.

What is needed is an automated screw driving machine that overcomes or reduces the problems and limitations described above and that may provide other advantages and benefits as well.

Numerous benefits and advantages of this invention will become apparent to those skilled in the art to which it pertains upon reading and understanding of the following detailed specification.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 5 is a top perspective view of a hopper and feeder assembly.

FIG. 8 is a side perspective view of a hopper filled with fasteners.

DETAILED DESCRIPTION

Figure 1:
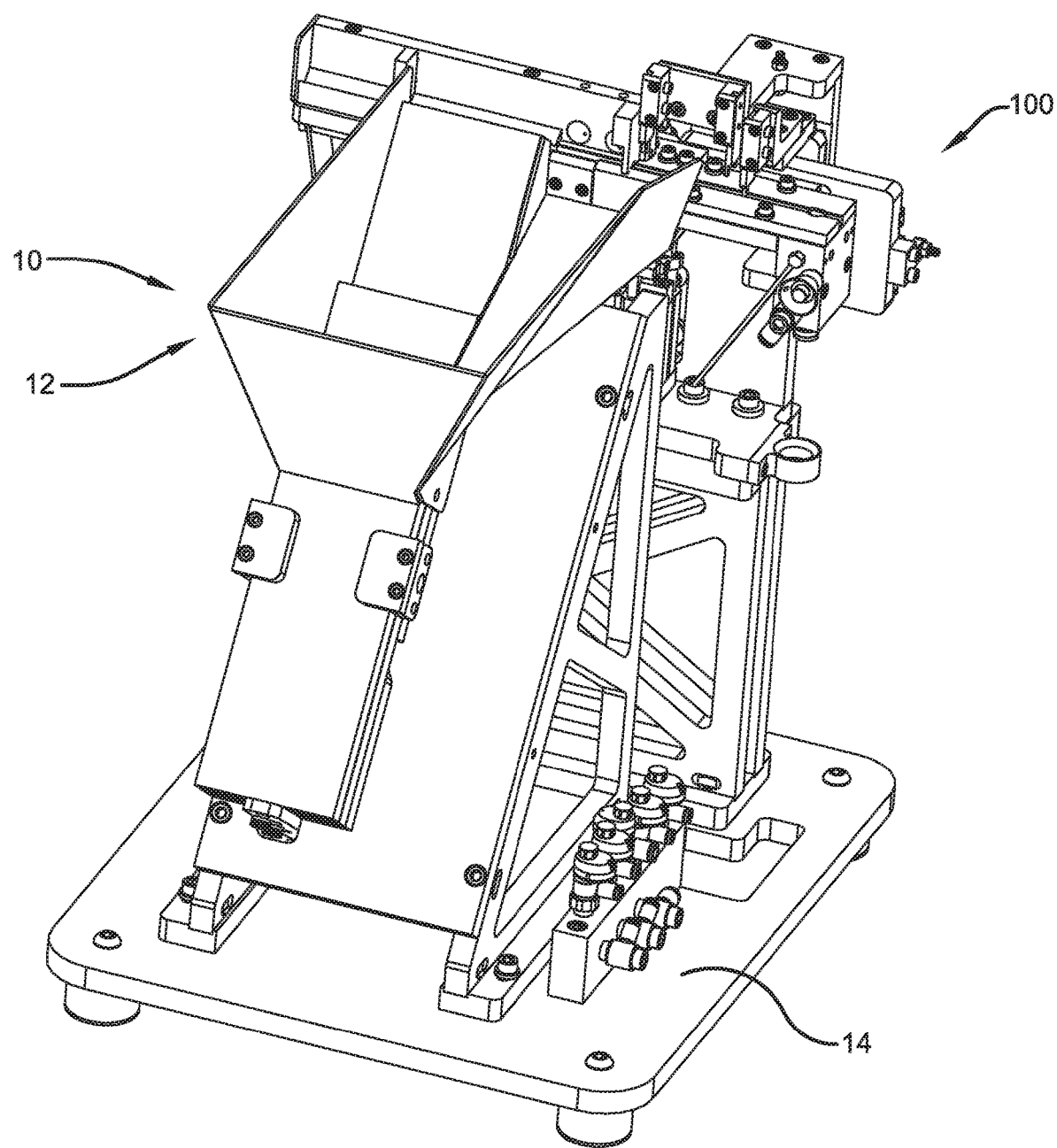
FIG. 1 is a perspective view of a portion of an automated screw driving machine according to some aspects of the present teaching.
Figure 2:
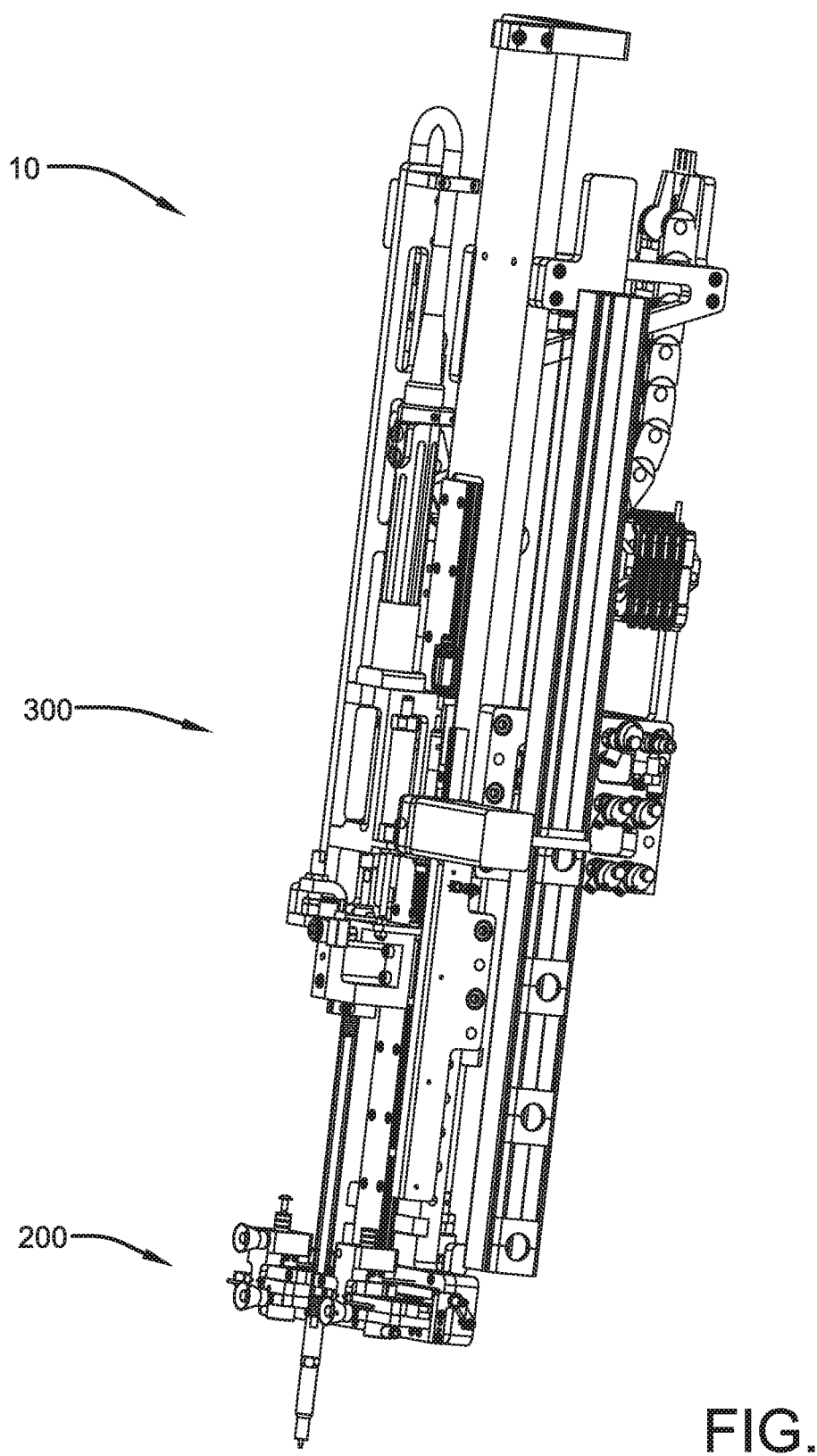
FIG. 2 is a perspective view of a portion of an automated screw driving machine according to some aspects of the present teaching.
Figure 4:
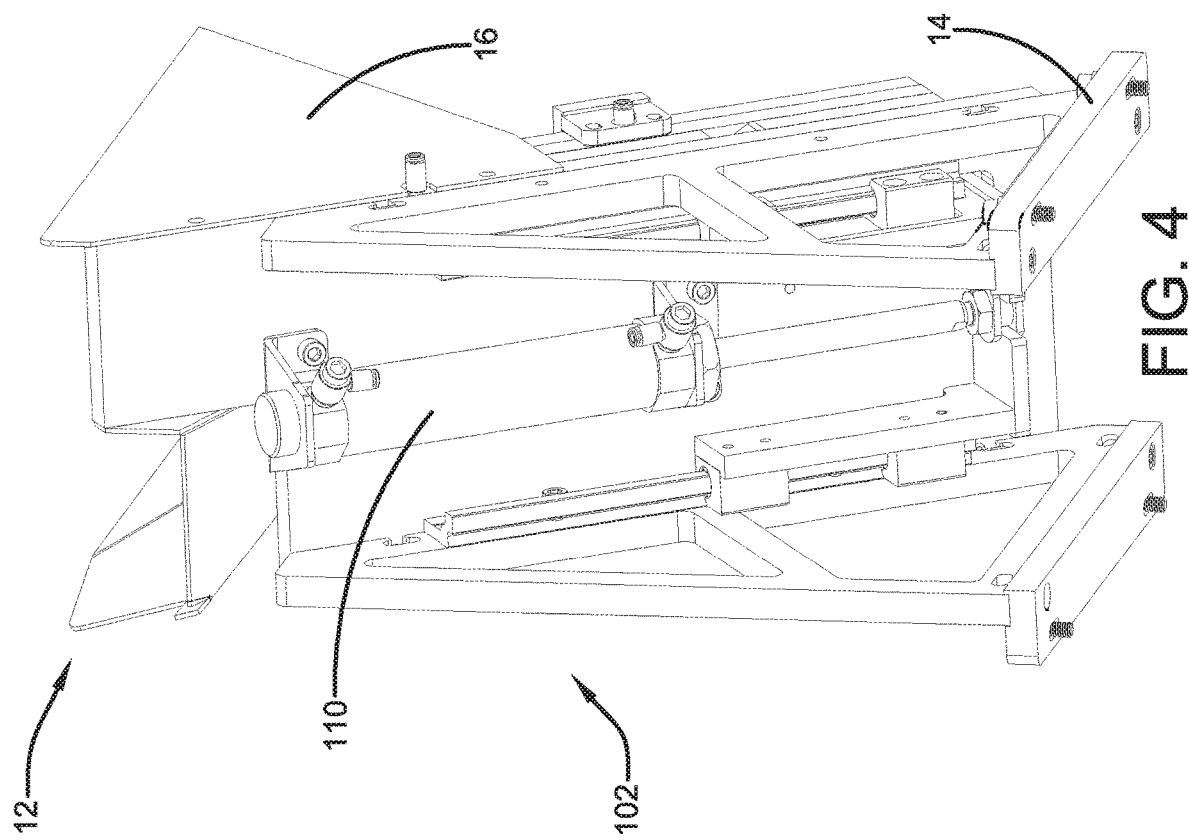
FIG. 4 is a back perspective view of a hopper.
Figure 3:
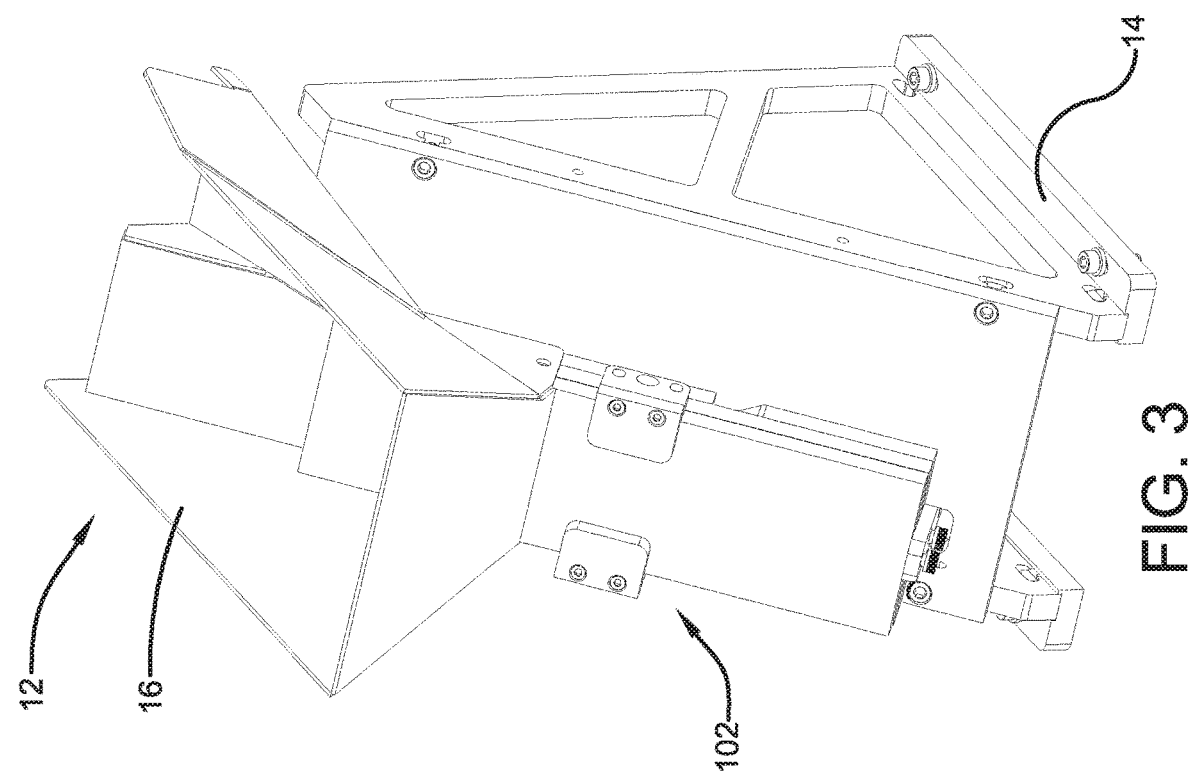
FIG. 3 is a front perspective view of a hopper.

Referring now to the drawings wherein the showings are for purposes of illustrating embodiments of the invention only and not for purposes of limiting the same, and wherein like reference numerals are understood to refer to like components, FIGS. 1 and 2 show portions of an automated screw driving machine 10 according to some aspects of the present teaching. The automated screw driving machine 10 may include a hopper 12, a feeder assembly 100, a chuck assembly 200, and a driver assembly 300. A drop point guard 400 may be provided to further assist in preventing misaligned fasteners from reaching chuck assembly 200. The hopper and assemblies will be discussed below. The automated screw driving machine 10 may be part of a robotic machine but that is not a requirement for this invention. While the hopper 12, feeder assembly 100, chuck assembly 200, driver assembly 300 and drop point assembly 400 are shown in a particular orientation and as having a particular size, it should be understood that the automated screw driving machine 10 components may be positioned in any orientation and may have any particular size chosen with the sound judgement of a person of skill in the art. It should also be noted that tubes and hoses that interconnect the screw driving machine are not shown for clarity.

Figure 6:
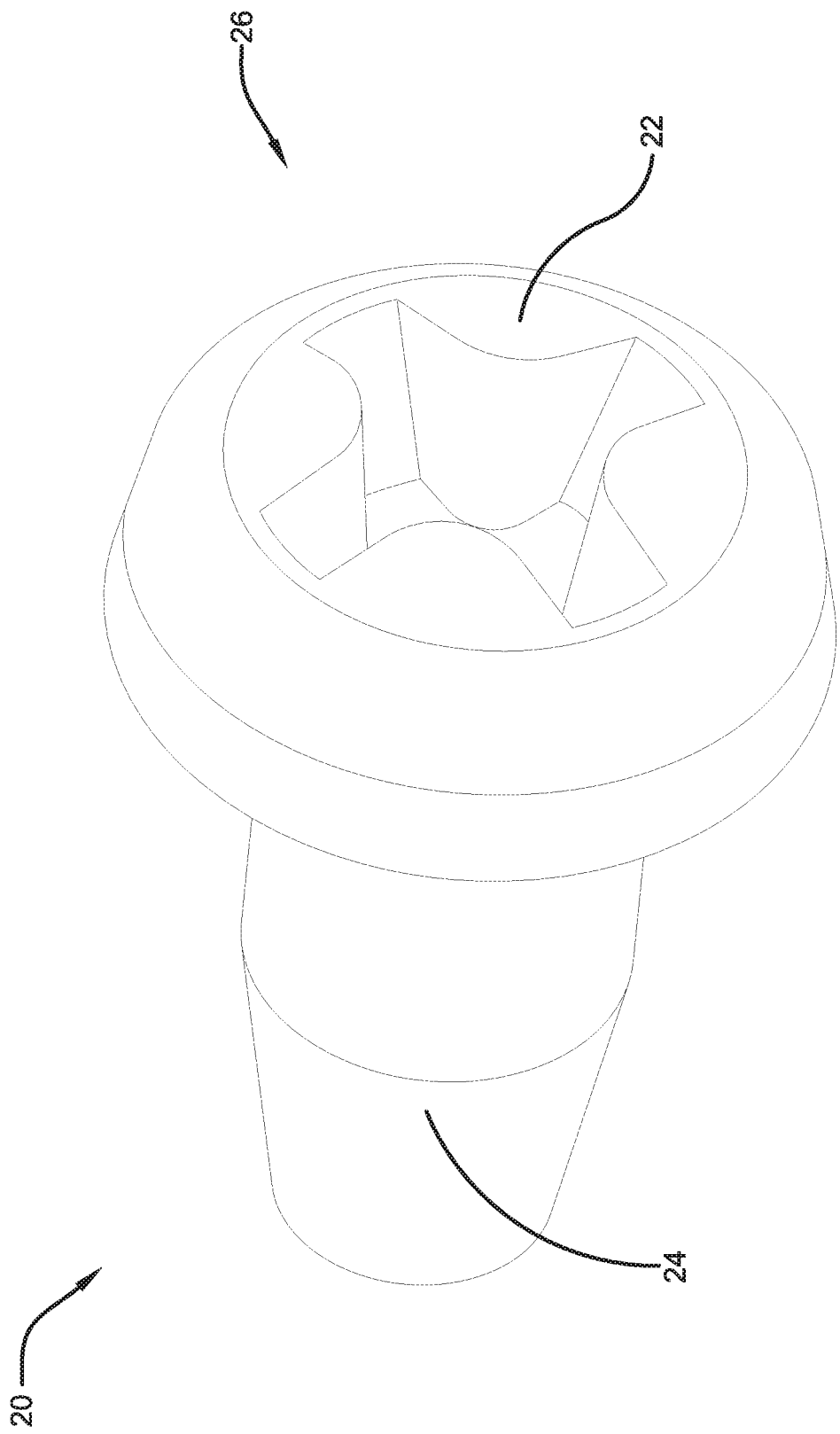
FIG. 6 is a perspective view of a fastener.
Figure 7:
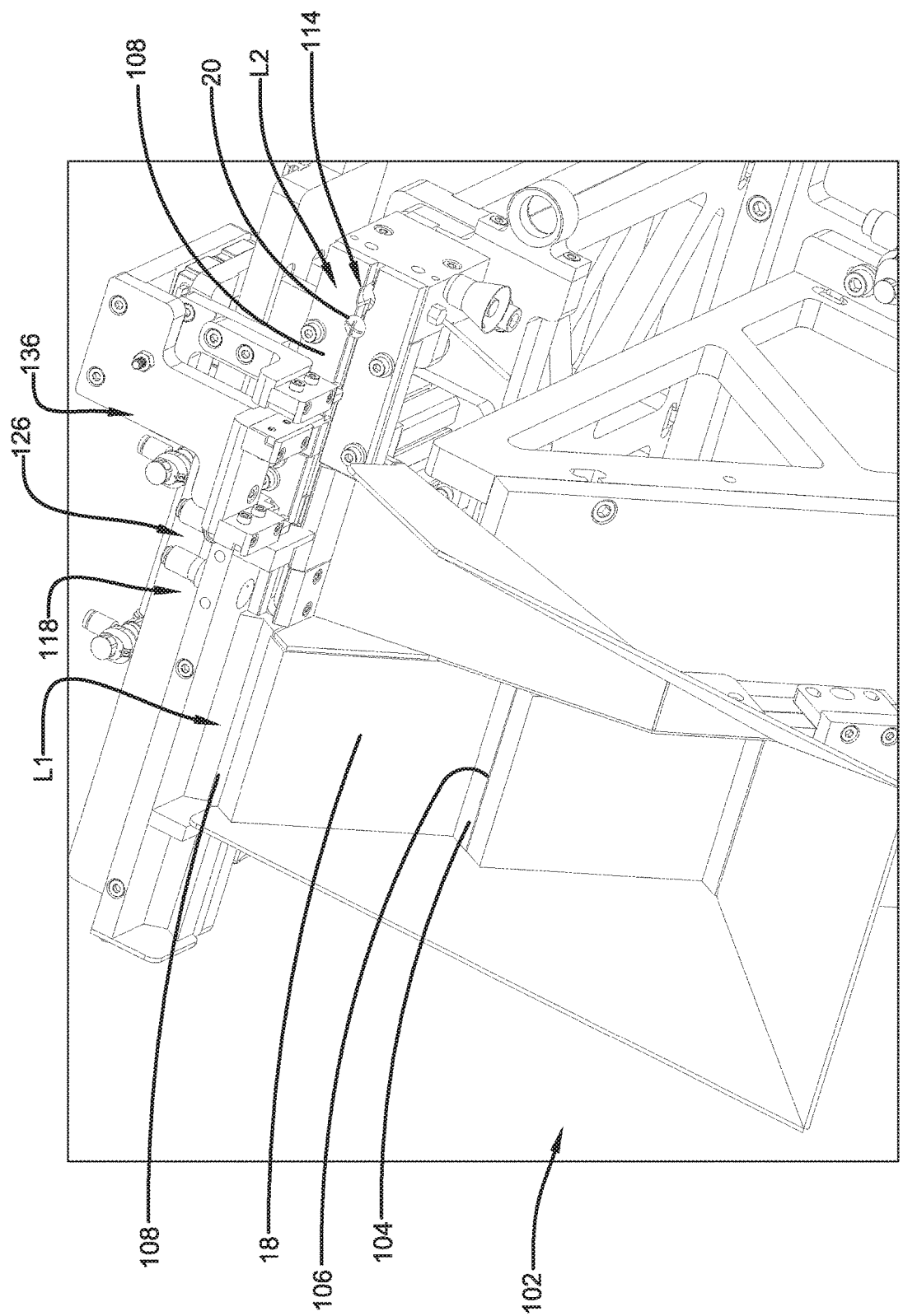
FIG. 7 is a top perspective view of a hopper and a feeder assembly.

With reference now to FIGS. 1 and 3-5, the hopper 12 may be supported to a surface, such as a floor, with a support structure 14 that can be of any type sufficient for the particular circumstances. The hopper 12 may comprise side walls 16 arranged to support the fasteners being used. FIG. 6 shows a generic fastener 20 having the well-known features of a fastener, including a head 22 and a shank 24. The head 22 may have a drive 26 that receives a drive bit in a manner well known to those of skill in the art. The shank 24 may be designed according to the component part and may, for example, comprise threads. FIG. 8 shows fasteners 20 within hopper 12 according to some aspects of the present teaching.

Figure 10:
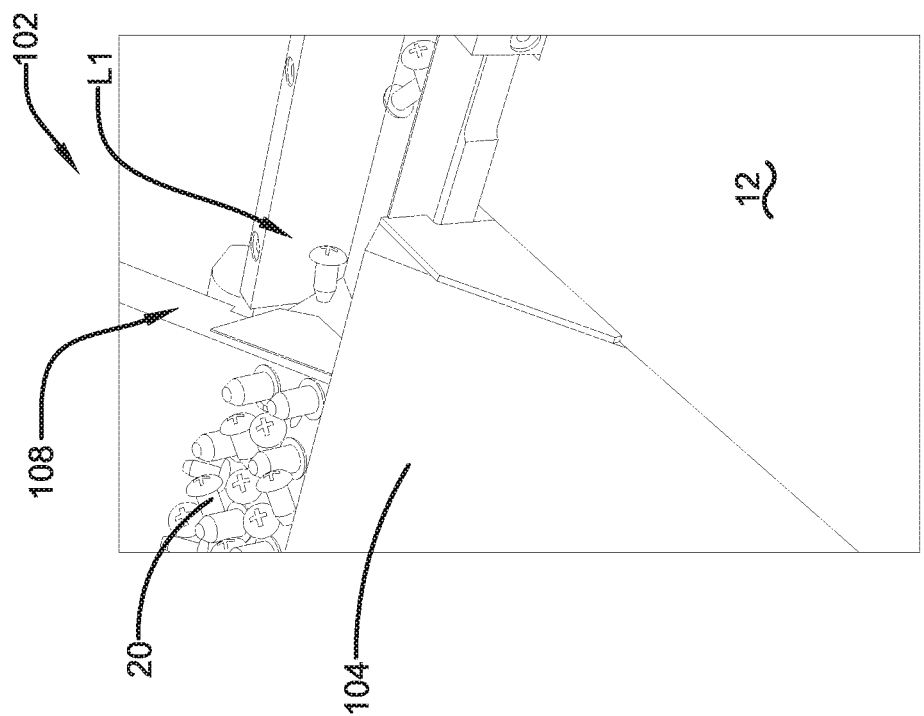
FIG. 10 is a view similar to that shown in FIG. 9 but with the fasteners shown exiting the hopper.
Figure 9:
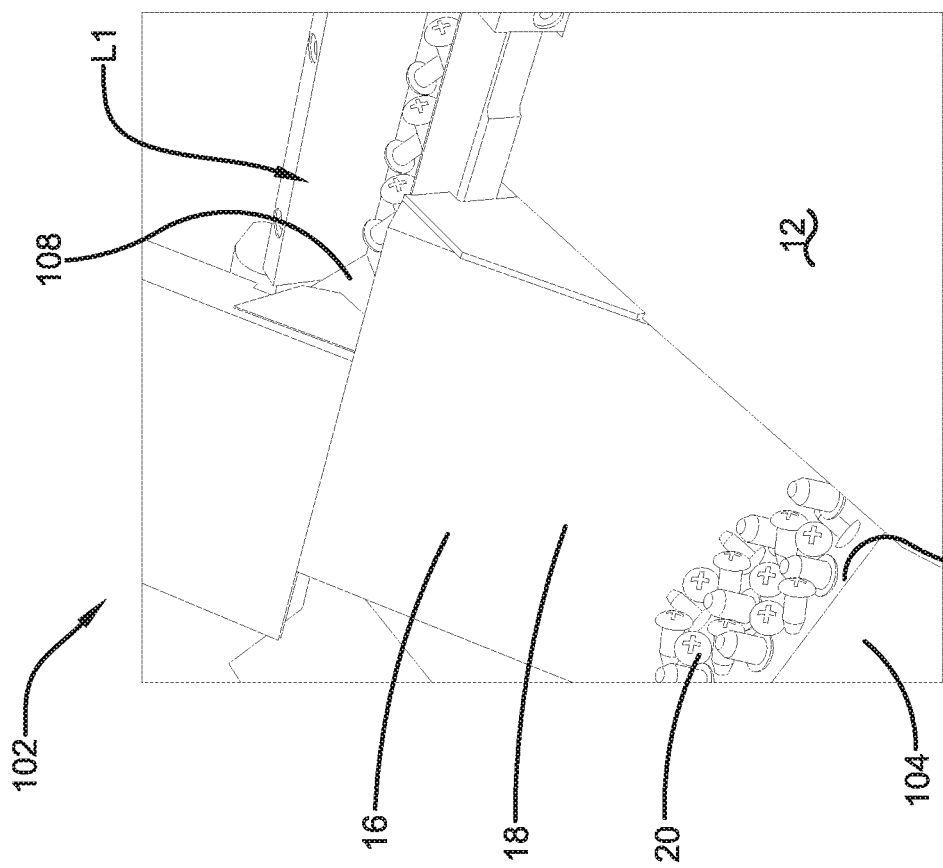
FIG. 9 is a front perspective view of a hopper showing fasteners being moved out of the hopper.
Figure 11:
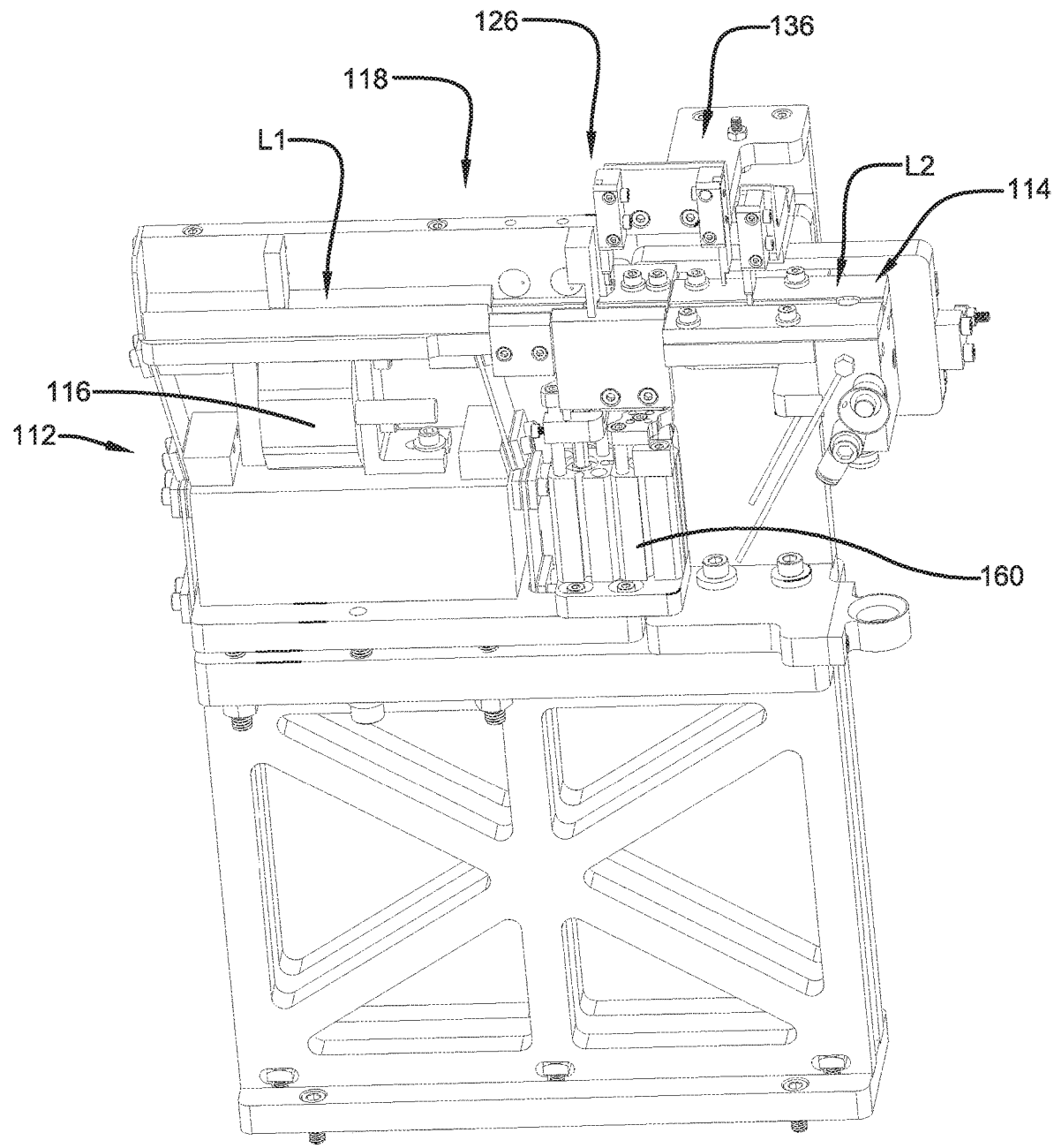
FIG. 11 is a front perspective view of a portion of an automated screw driving machine with components removed for clarity.
Figure 12:
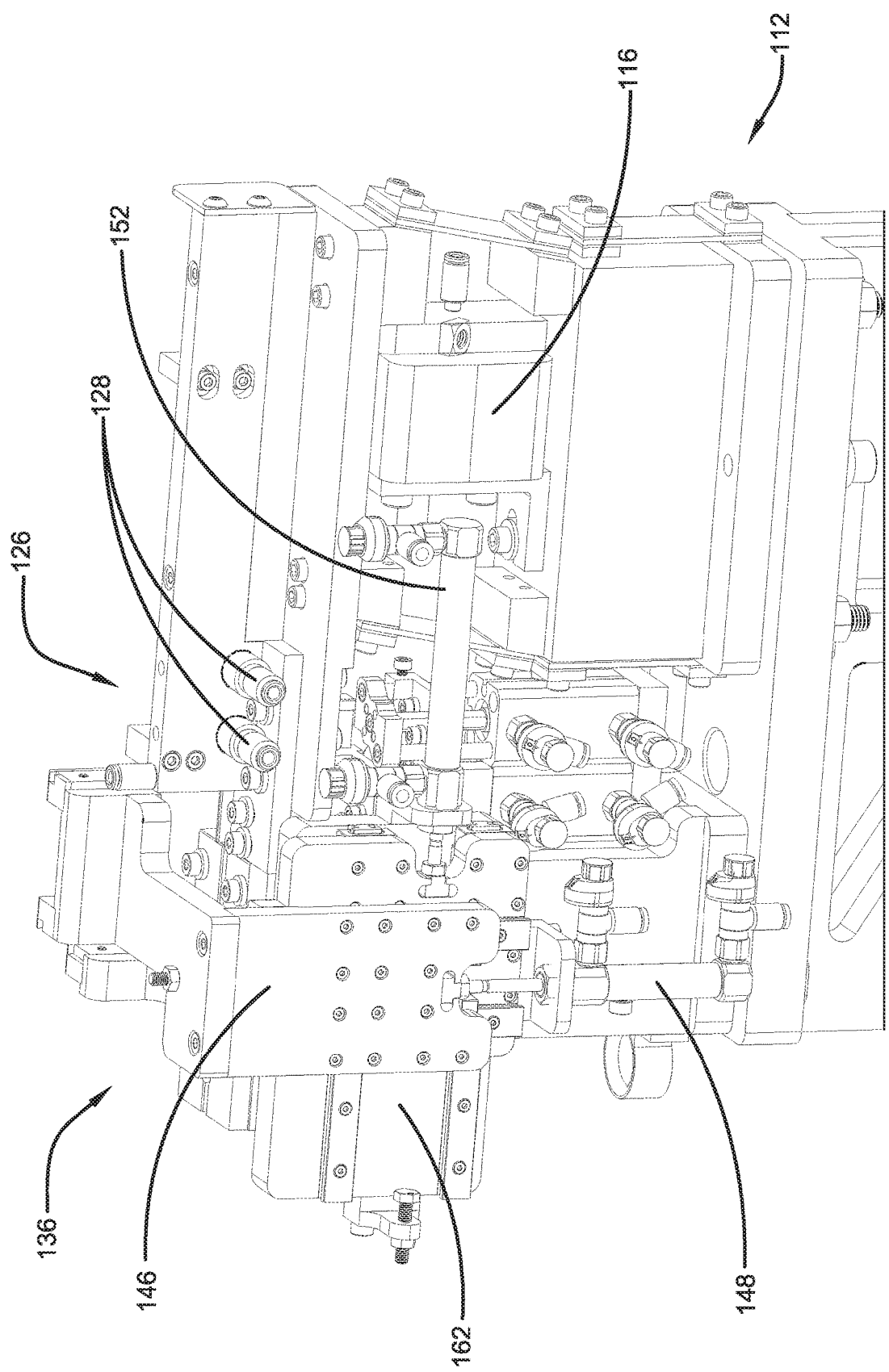
FIG. 12 is a back perspective view of a portion of an automated screw driving machine with components removed for clarity.
Figure 13:
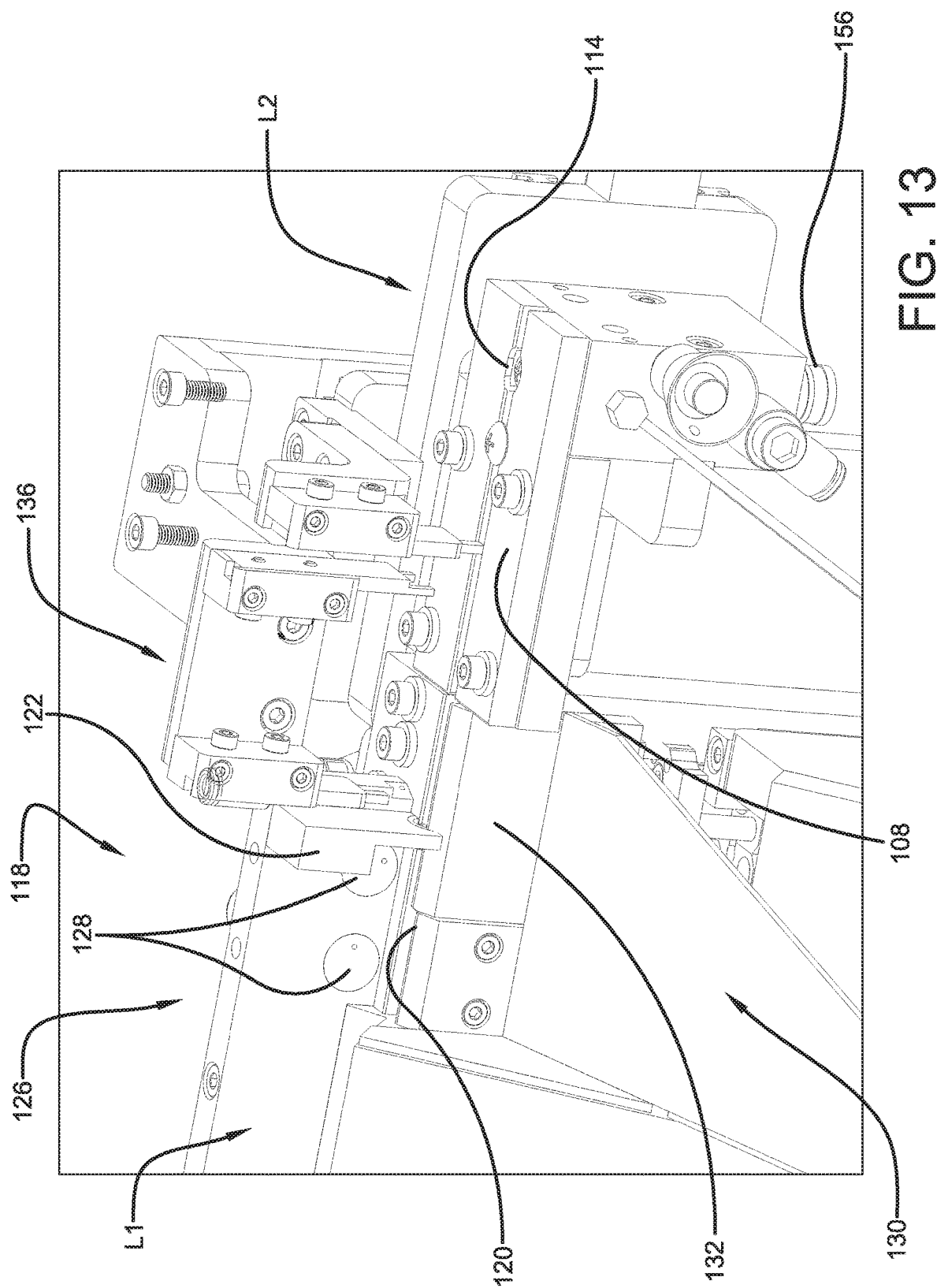
FIG. 13 is a close-up front view of a portion of an automated screw driving machine showing a fastener transport surface.
Figure 14:
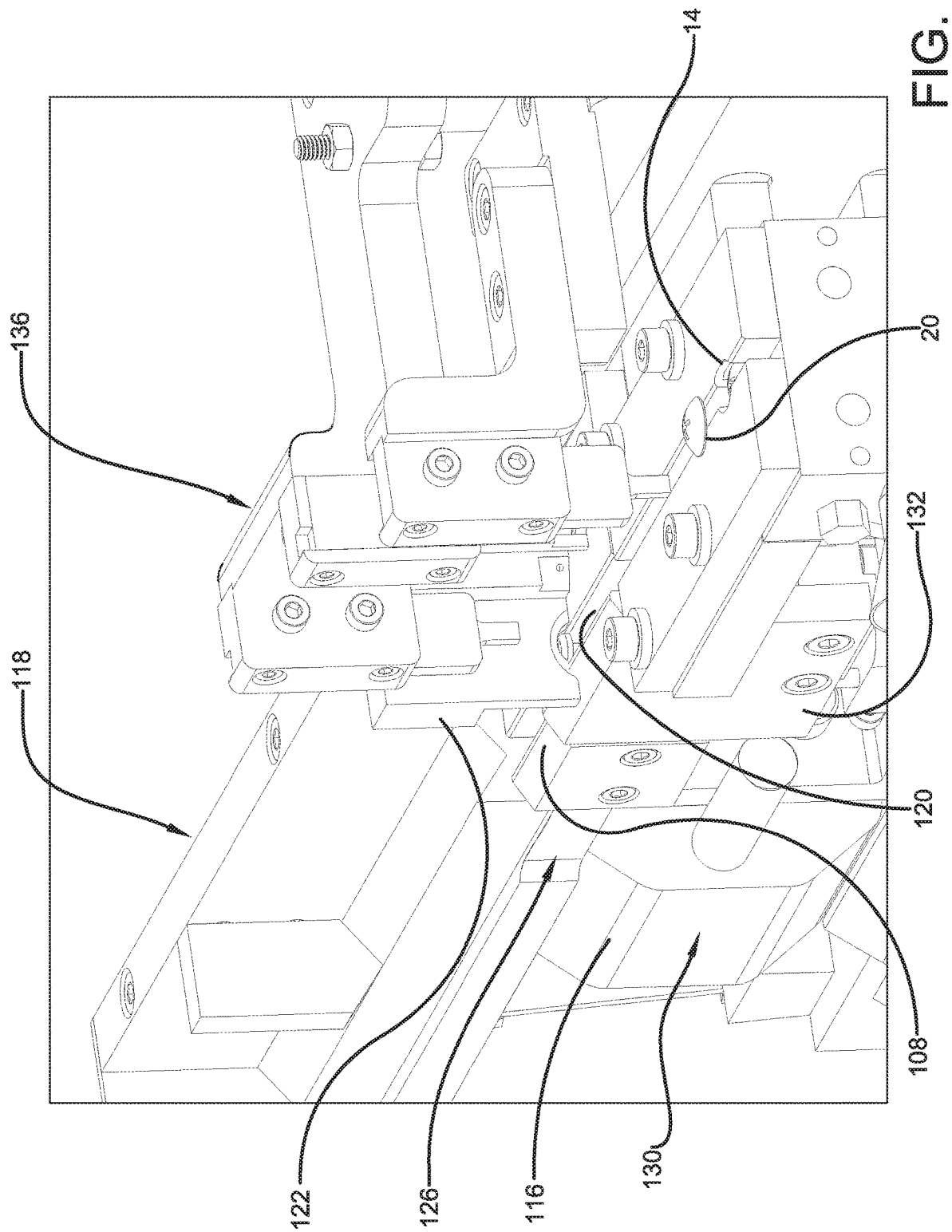
FIG. 14 is a close-up side view of a portion of an automated screw driving machine showing a fastener transport surface.
Figure 15:
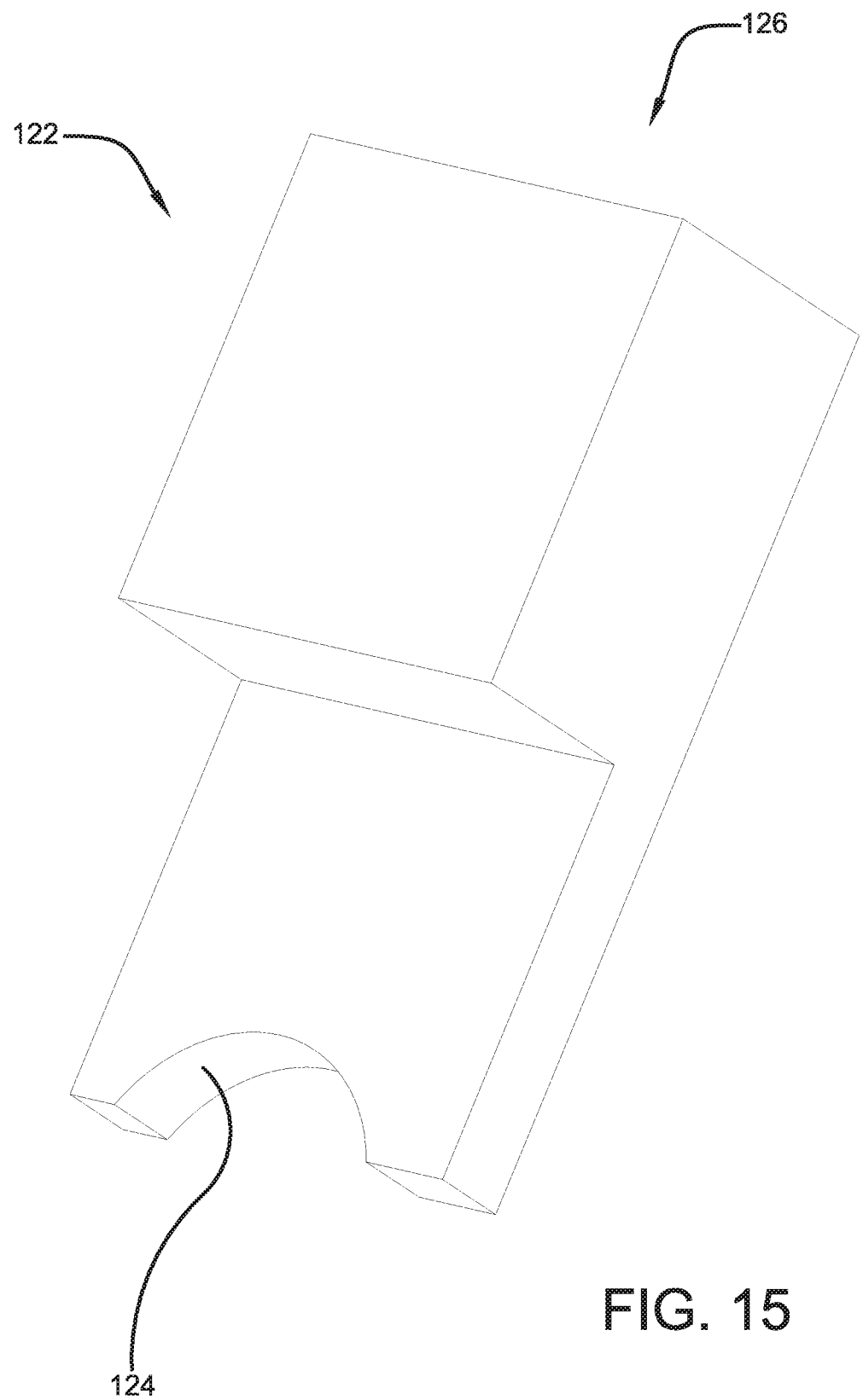
FIG. 15 is a perspective view of a confinement device.

With reference now to FIGS. 1-10, the feeder assembly 100 may convey the fasteners from the hopper 12 to the chuck assembly 200. The feeder assembly 100 may be supported to a surface, such as a floor, with support structure 14. A fastener conveyance structure 102 may be used to convey the fasteners out of the hopper 12. According to some aspects of the present teaching, the fastener conveyance structure 102 may include a plate 104 having a contact surface 106. Although the contact surface may be arranged in any manner chosen with the sound judgment of a person of skill in the art, in the example shown the contact surface 106 may be positioned generally orthogonally with respect to an adjacent one 18 of the side walls 16 of the hopper 12. The plate 104 may be substantially parallel to side wall 18, as shown. The plate 104 may be moveable with respect to the side wall 18. As one example, the plate 104 may move relatively upwards within the hopper 12 so that fasteners 20 received on the contact surface 106 can be conveyed from a position relatively lower within the hopper 12 (such as shown in FIGS. 8-9) to a position relatively higher and out of the hopper 12 (such as shown in FIG. 10) onto a transport surface 108. The plate 104 may then be moved relatively downwards within the hopper 12 so that additional fasteners 20 may be received on contact surface 106. A force generating device 110, see FIG. 4, may be used to cause the plate 104 to move to convey the fasteners 20. Although the force generating device may be of any type chosen with the sound judgment of a person of skill in the art, in the example shown the force generating device 110 is a pneumatic cylinder.

With reference now to FIGS. 5-15, according to some aspects of the present teaching, a fastener conveyance structure 112 may be used to convey the fasteners 20 along the transport surface 108 from location L1, where they are deposited by the conveyance structure 102, to location L2 having an opening 114 for further conveyance. The conveyance structure 112 may comprise, as one example, one or more vibrators 116, shown in FIGS. 11-12, that vibrate the transport surface 108 causing the fasteners to be conveyed from location L1 toward location L2. Because the fasteners 20 are typically randomly distributed within the hopper 12, it may be desirable to place each fastener into a specific orientation or alignment for conveyance along the transport surface 108. To accomplish this, a fastener orientation structure 118 may be used. The fastener orientation structure 118 may include a groove 120 formed in the transport surface 108 that is sized to receive fastener shanks 24 but not fastener heads 22, as shown. The fastener orientation structure 118 may include a confinement device 122. The confinement device 122 seen best in FIG. 15, may have an opening or groove 124 that may be positioned directly above the groove 120. The groove 124 may be shaped to permit fastener heads 22 in the proper orientation to pass through along the transport surface 108 but to prevent fasteners 20 in any other orientation from moving any farther along the transport surface 108.

With reference now to FIGS. 5-18, according to some aspects of the present teaching, one or more fastener removal structures may be used to remove misaligned and/or excess fasteners 20 from the transport surface 108. The previously described confinement device 122 may operate as a fastener removal structure 126 in that misaligned fasteners 20 will likely contact the confinement device 122 as they are moved along the transport surface 108 and thereby be knocked into the hopper 12. According to some aspects of the present teaching, a fastener removal structure 126 may include one or more blowers 128, two shown, that exert an air (or other gas) force across the top of the transport surface 108. Fasteners 20 that are properly oriented/aligned on the transport surface 108 (shanks 24 properly received within groove 120) will not be affected by a blower 128. However, any misaligned or extra fastener 20 will feel the force from the blower 128 and thus be blown off of the transport surface 108 back into the hopper 12.

Figure 16:
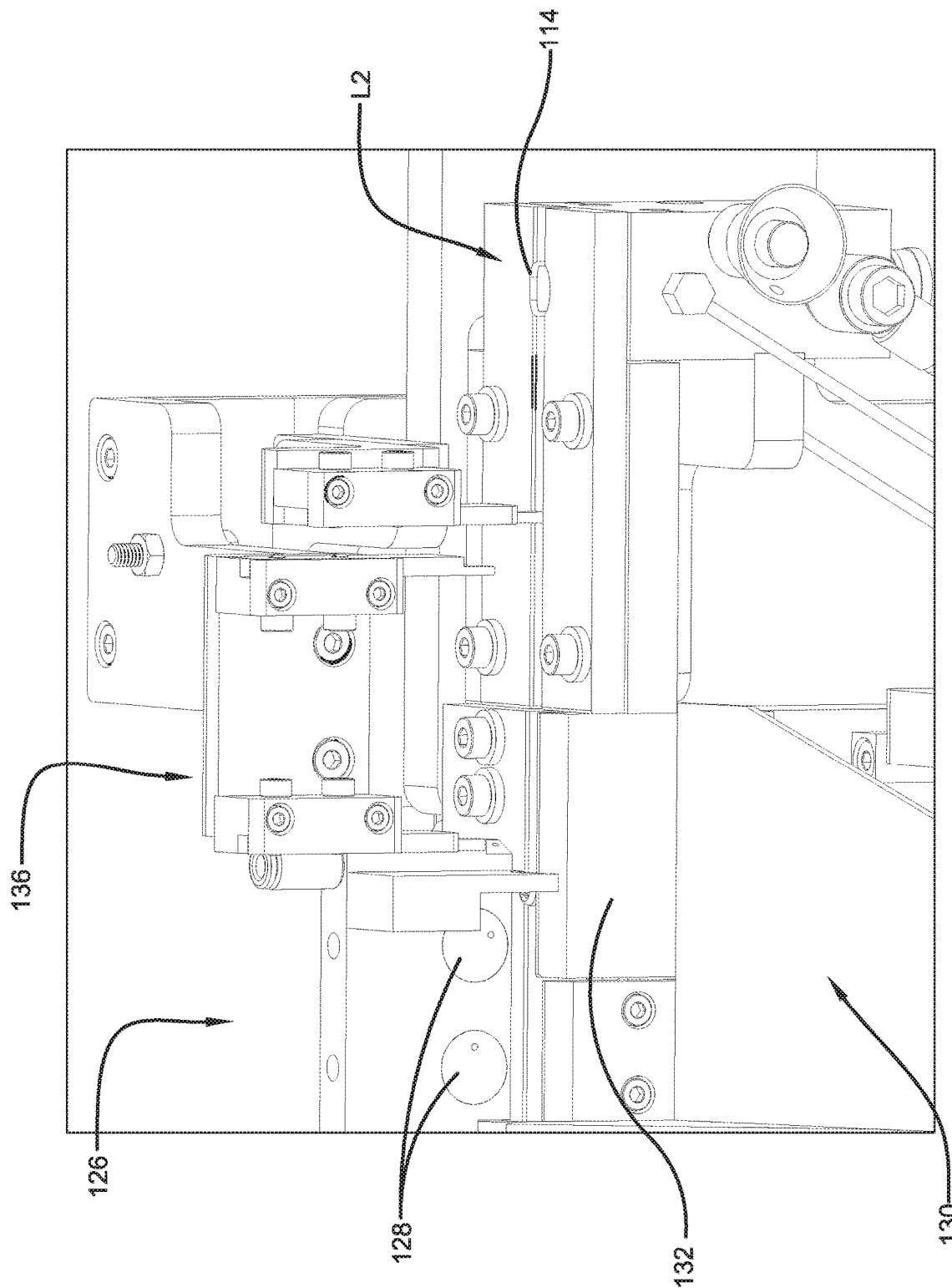
FIG. 16 is a close-up front view of a portion of an automated screw driving machine showing a movable portion of the fastener transport surface in an upright position.
Figure 17:
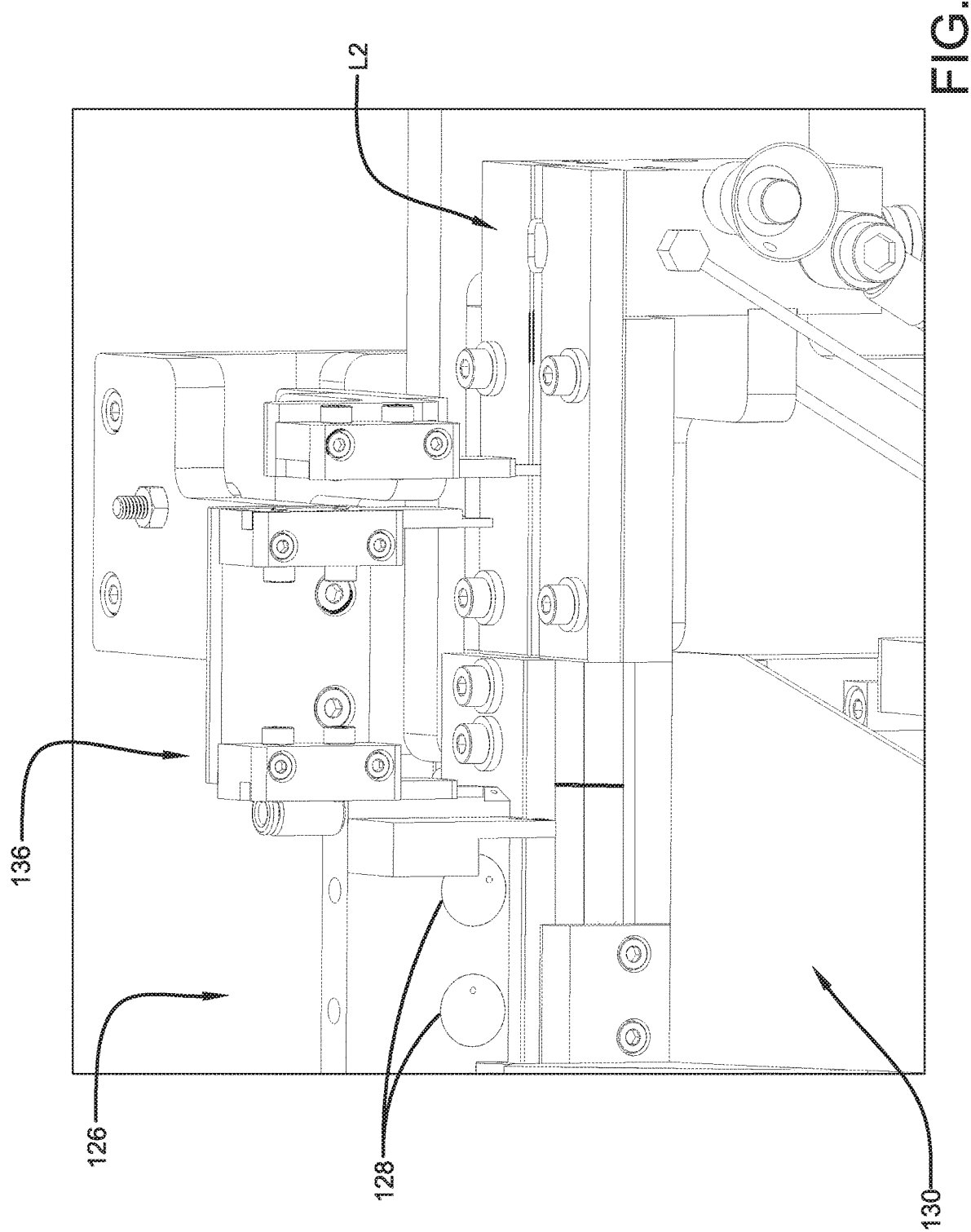
FIG. 17 is a view similar to that shown in FIG. 16 but with the movable portion in a retracted position.
Figure 18:
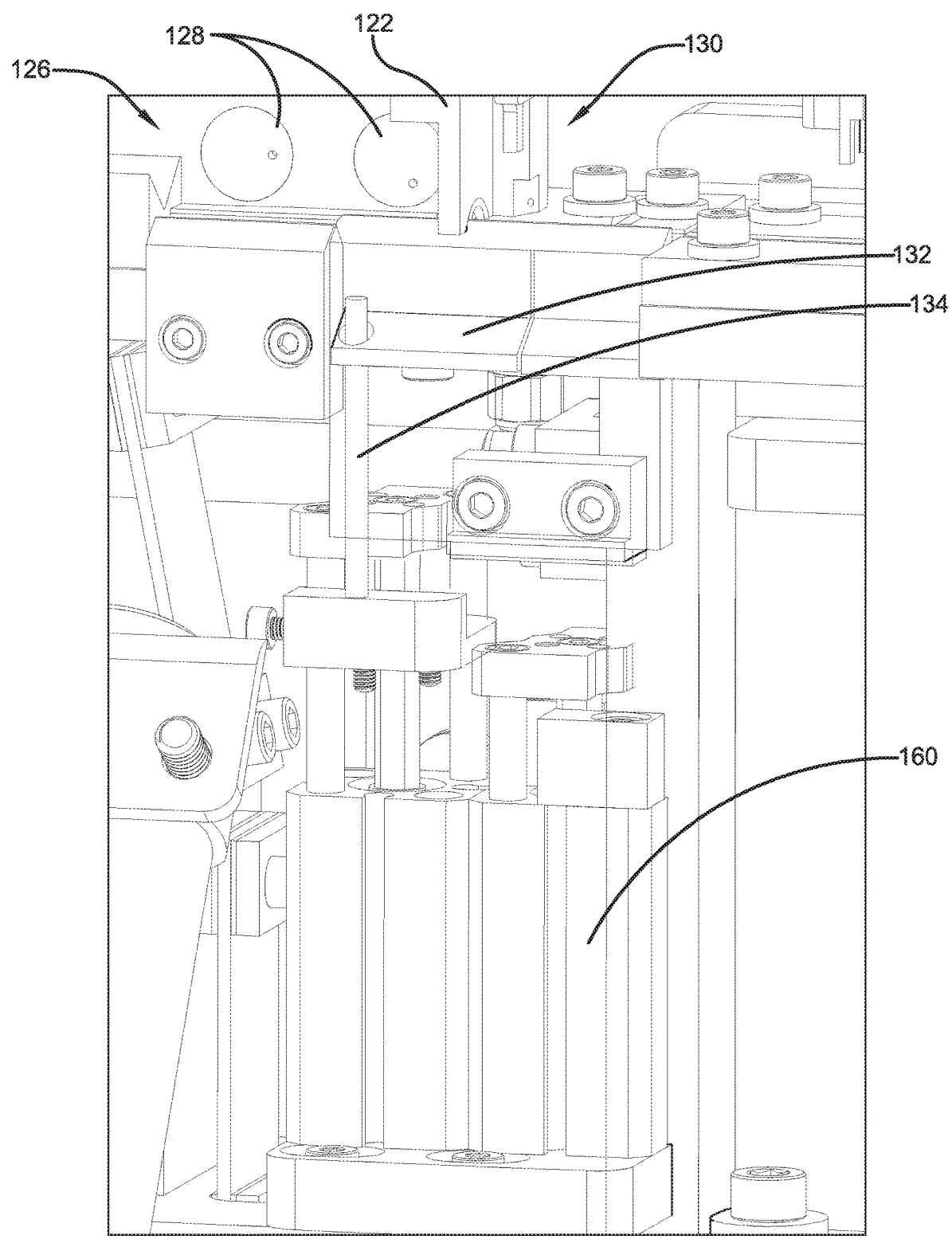
FIG. 18 is a close-up front view showing the movable portion shown in FIG. 16 as being transparent.

With reference now to FIGS. 13-14, and 16-18, according to some aspects of the present teaching, a fastener removal structure 130 may include a movable portion 132 of the transport surface 108 that can be retracted so that any fasteners 20 positioned on the movable portion 132 are no longer supported and therefore fall back into the hopper 12. FIG. 16 shows movable portion 132 in its normal upright position and FIG. 17 shows movable portion 132 in its retracted position. FIG. 18 shows movable portion 132 as being transparent. As seen best in FIG. 18, a force generating device 160 may be used to retract movable portion 132. While the force generating device 160 may be of any type and size chosen with the sound judgment of a person of skill in the art, the force generating device 160 shown may be a pneumatic cylinder. The movable portion 132 may have an opening that receives rod 134 and movable portion 132 may move along the rod 134 between the upright and retracted positions. While the movable portion 132 may be positioned according to the sound judgment of a person of skill in the art, in the example shown the confinement device 122 is positioned above the movable portion 132. In this way, any fasteners 20 that are prevented by the confinement device 122 from passing further along the transport surface 108 but do not fall off on their own accord can be removed from the transport surface 108 and dumped back into the hopper 12 by moving the movable portion 132 into the retracted position.

Figure 19:
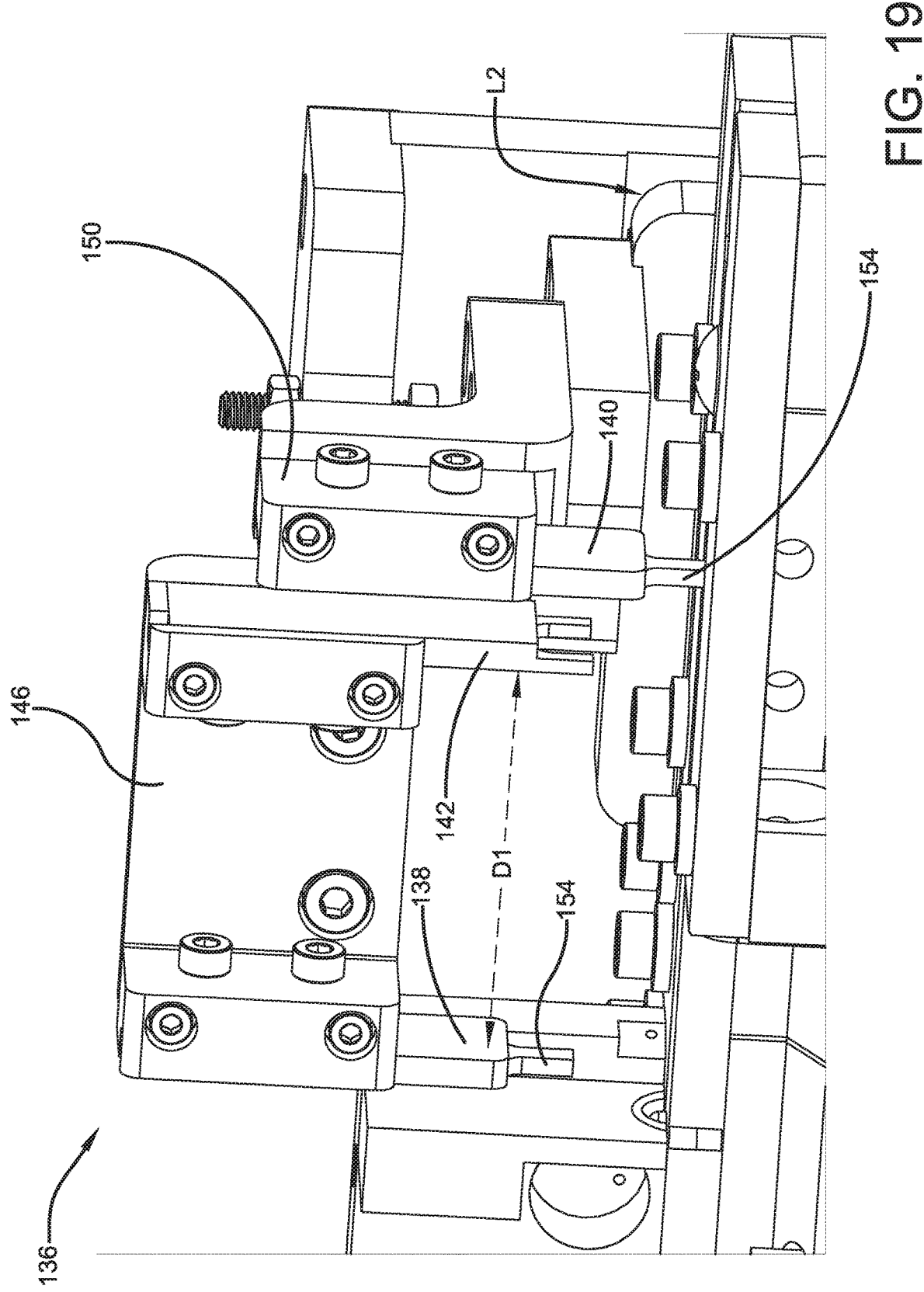
FIG. 19 is a close-up view of a fastener conveyance structure.

With reference now to FIGS. 19-23, according to some aspects of the present teaching a fastener conveyance structure 136 may be used to move the fasteners 20 from the confinement device 122 to location L2 and the opening 114. Fastener conveyance structure 136 may include tabs 138, 140 and confinement device 142. Each tab 138, 140 may have an extension 154 that can be positioned within the groove 120. The confinement device 142 may have an opening or groove 144, see FIG. 20, enabling confinement device 142 to operate similar to previously described confinement device 122. Tab 138 and confinement device 142 may be supported to the same supporting structure 146 and separated by a distance D1 as indicated in FIG. 19. Distance D1 will vary depending on the particular fastener application. A force generating device 148, which may be a pneumatic cylinder, may be used to move the supporting structure 146, and thus the tab 138 and confinement device 142, vertically. Tab 140 may be supported to supporting structure 150. A force generating device 152, which may be a pneumatic cylinder, may be used to move the supporting structure 146 and the supporting structure 150 (and thus the tabs 138,140, and confinement device 142) horizontally with respect to supporting structure 162.

Figure 20:
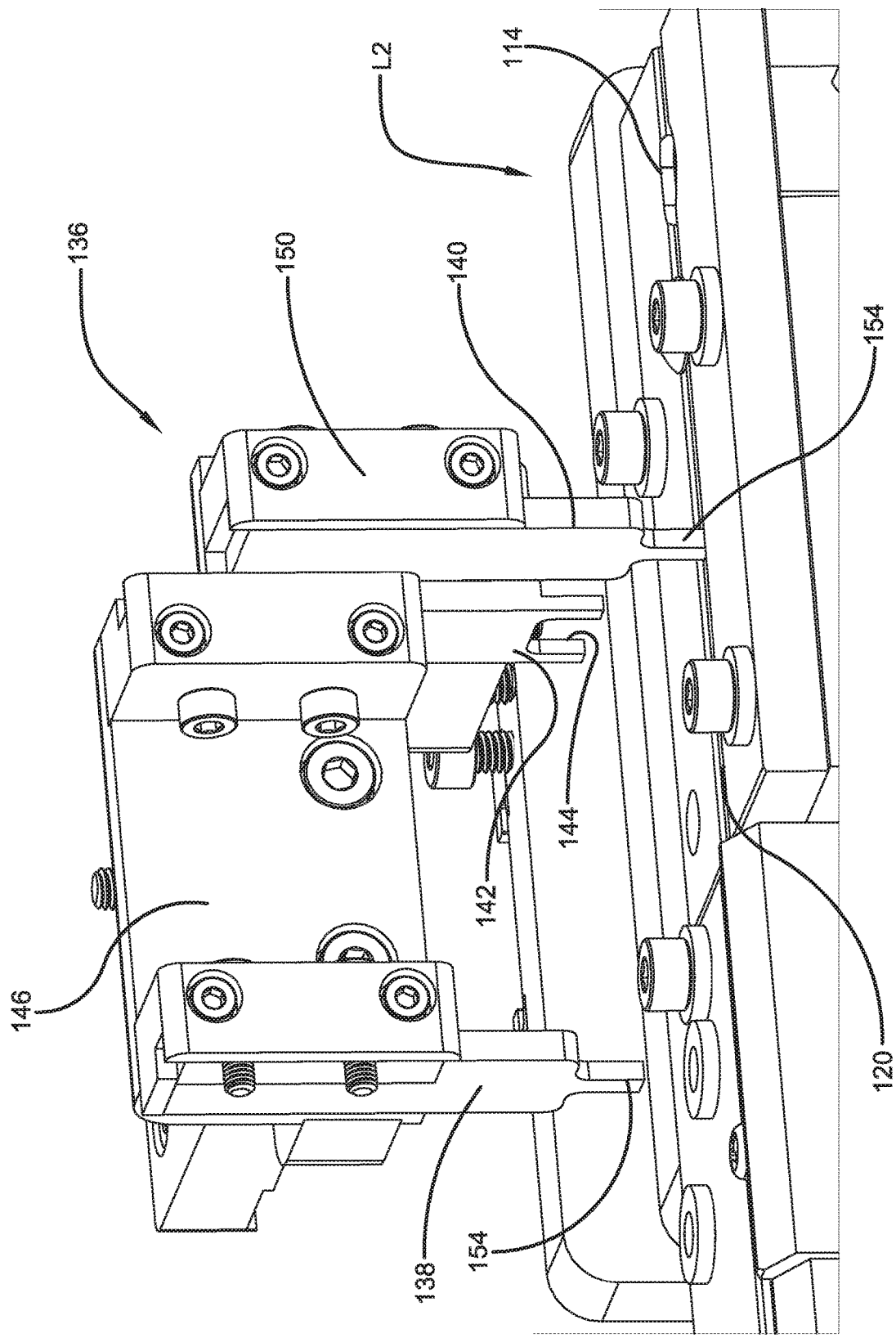
FIG. 20 is a close-up view similar to that shown in FIG. 19 but from a different angle.
Figure 21:
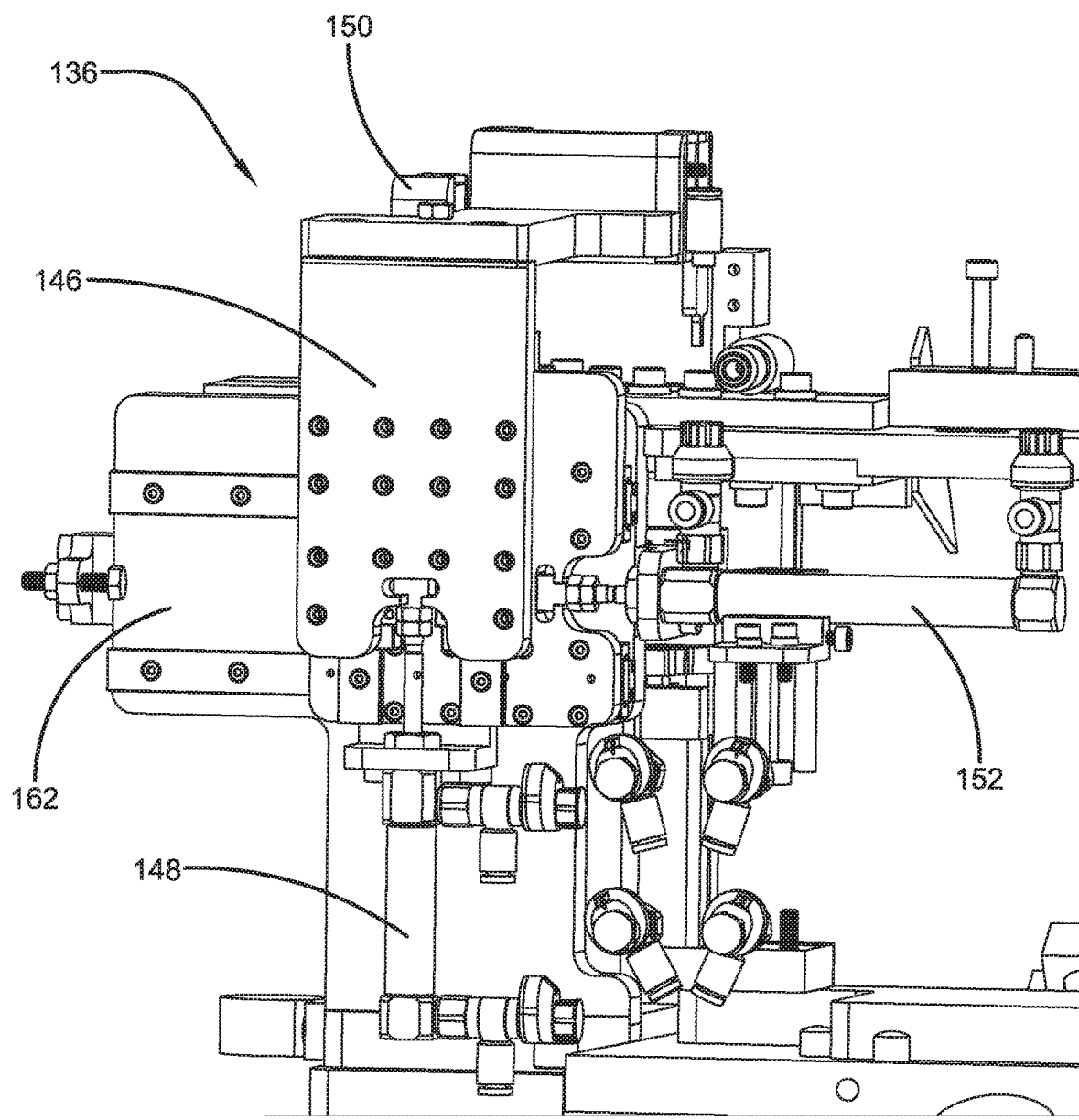
FIG. 21 is a back view of a portion of an automated screw driving machine with components removed for clarity.
Figure 22:
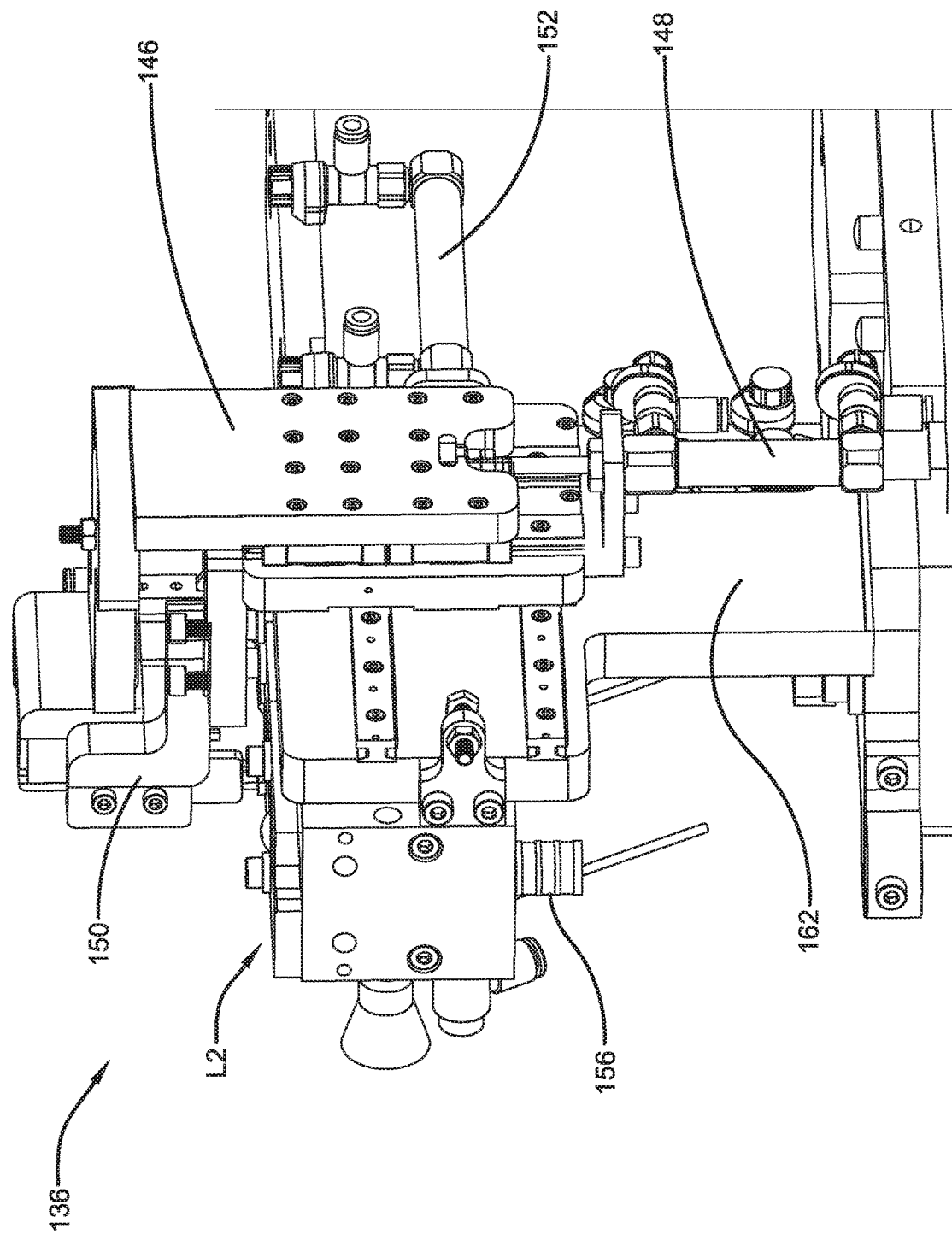
FIG. 22 is a view similar to that shown in FIG. 21 but from a different angle.
Figure 23:
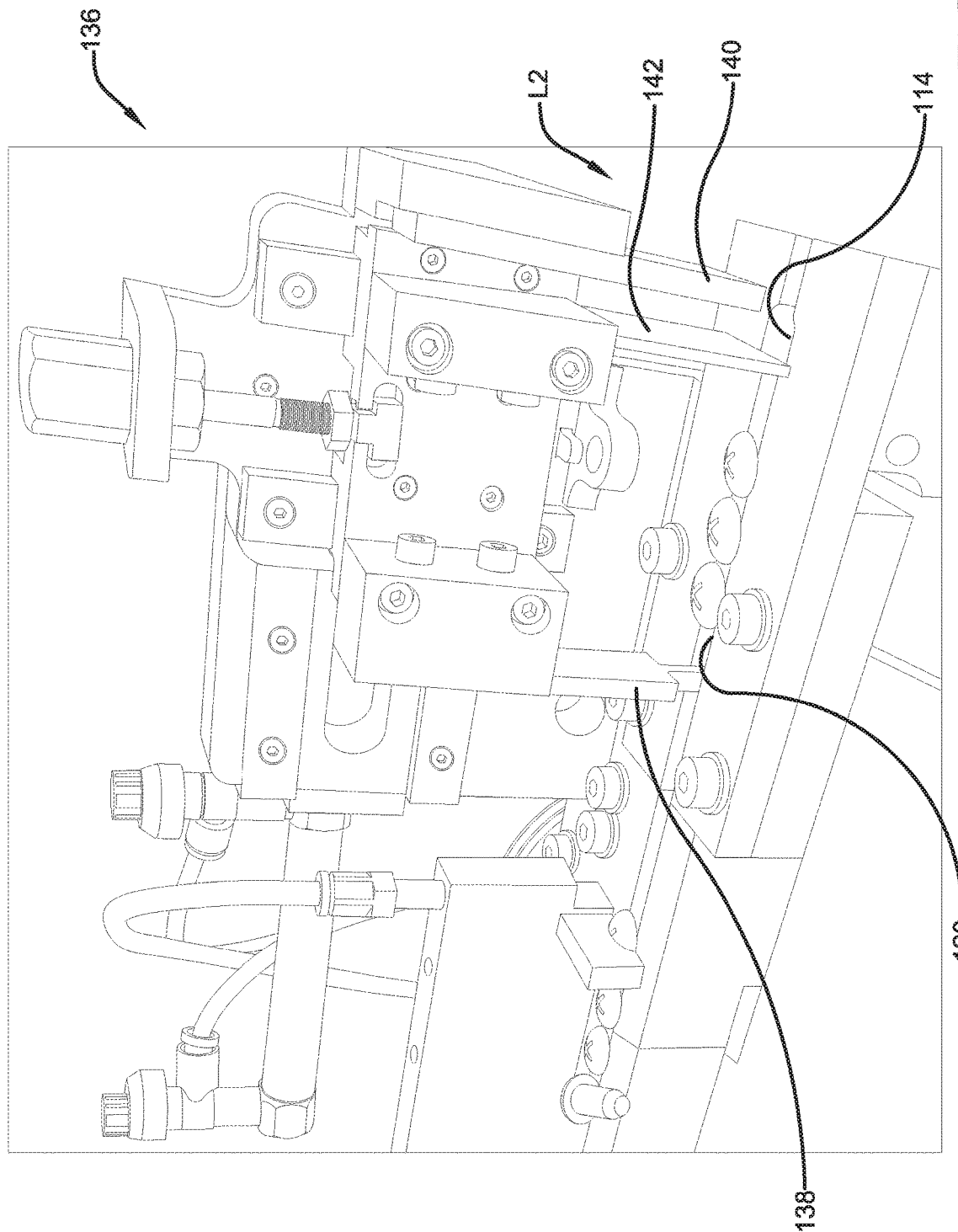
FIG. 23 is a close-up front view of a fastener conveyance structure.
Figure 24:
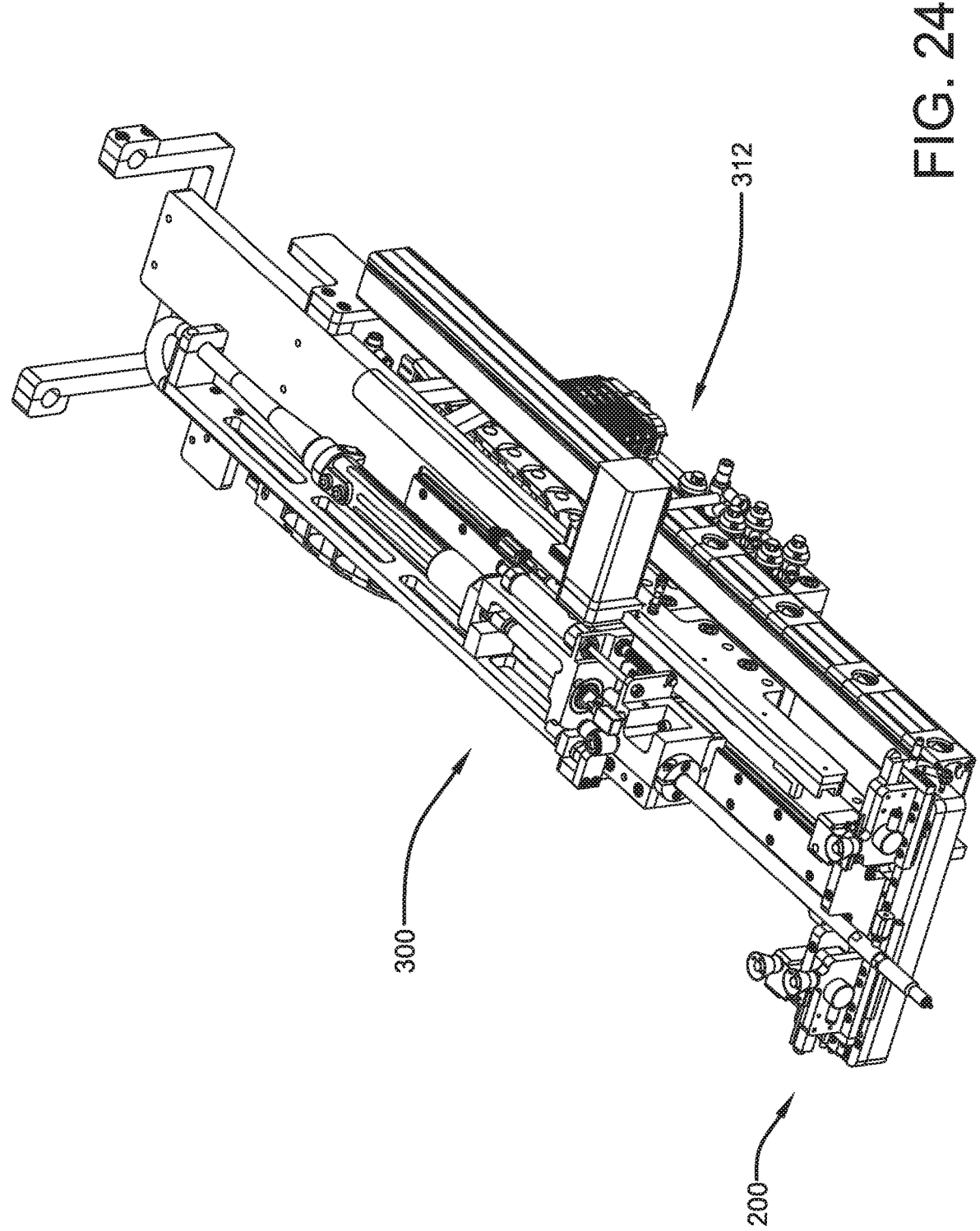
FIG. 24 is a top perspective view of a portion of an automated screw driving machine with components removed for clarity.
Figure 25:
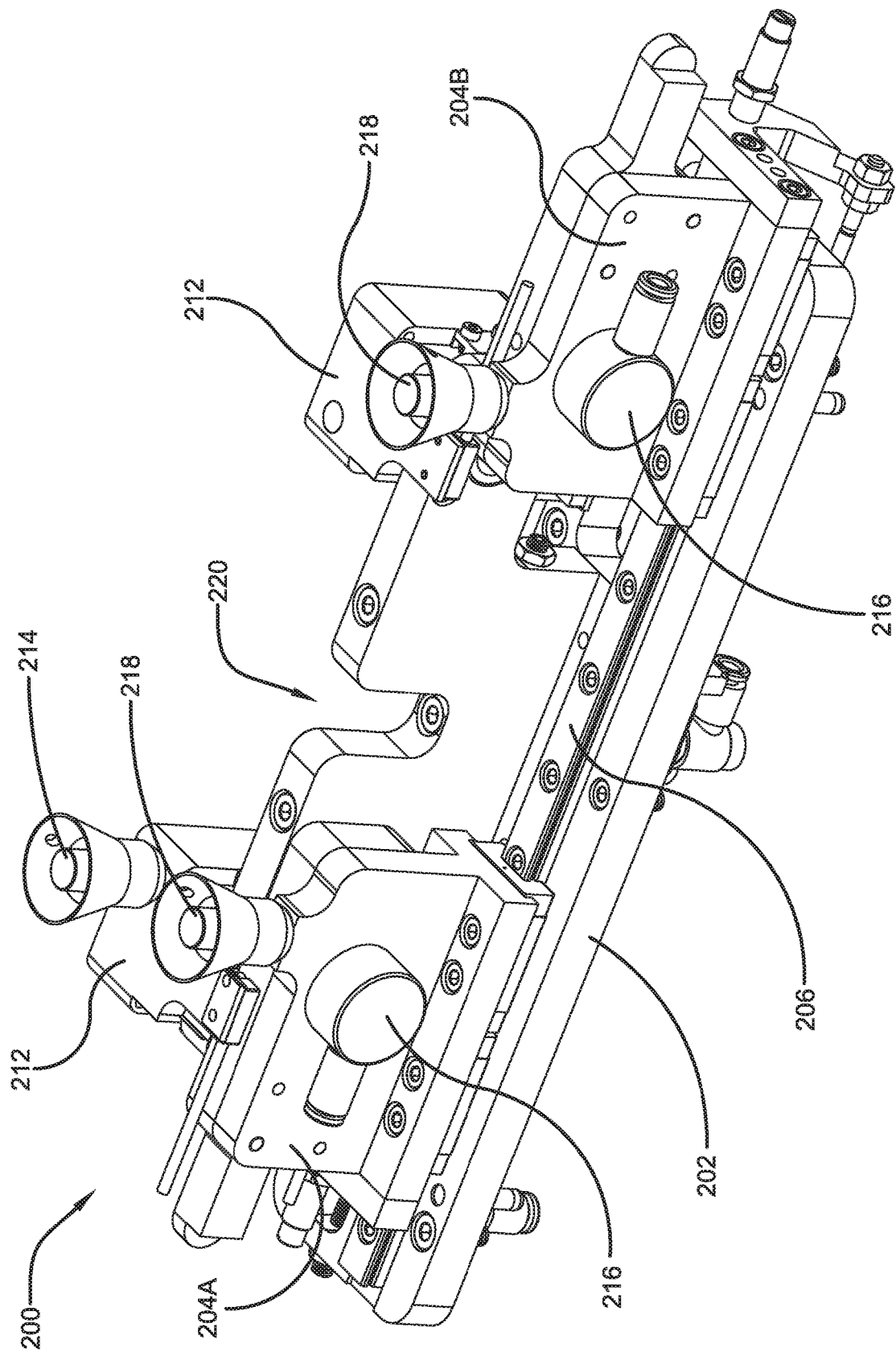
FIG. 25 is a front perspective view of a chuck assembly.
Figure 26:
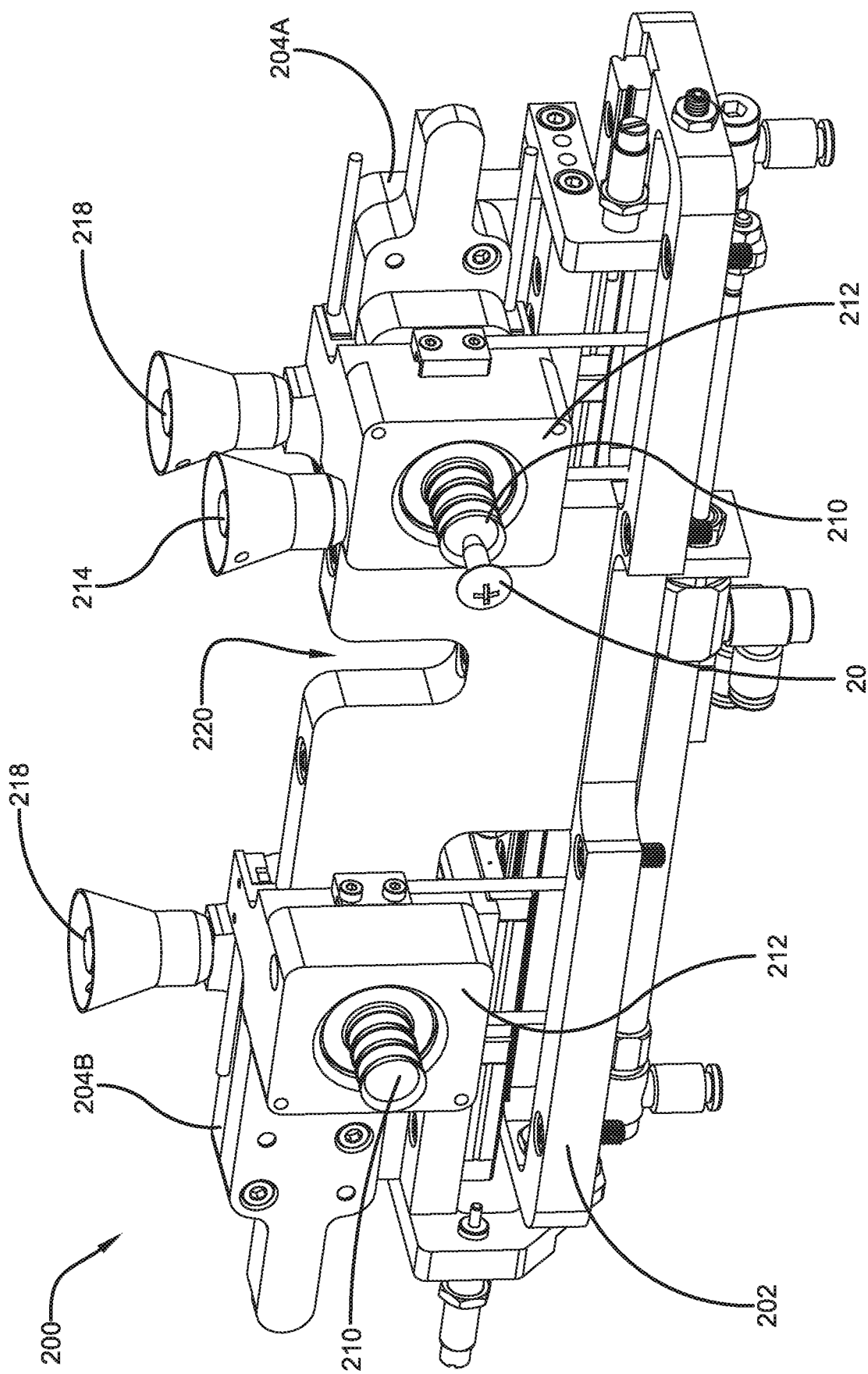
FIG. 26 is a back perspective view of the chuck assembly shown in FIG. 25.
Figure 27:
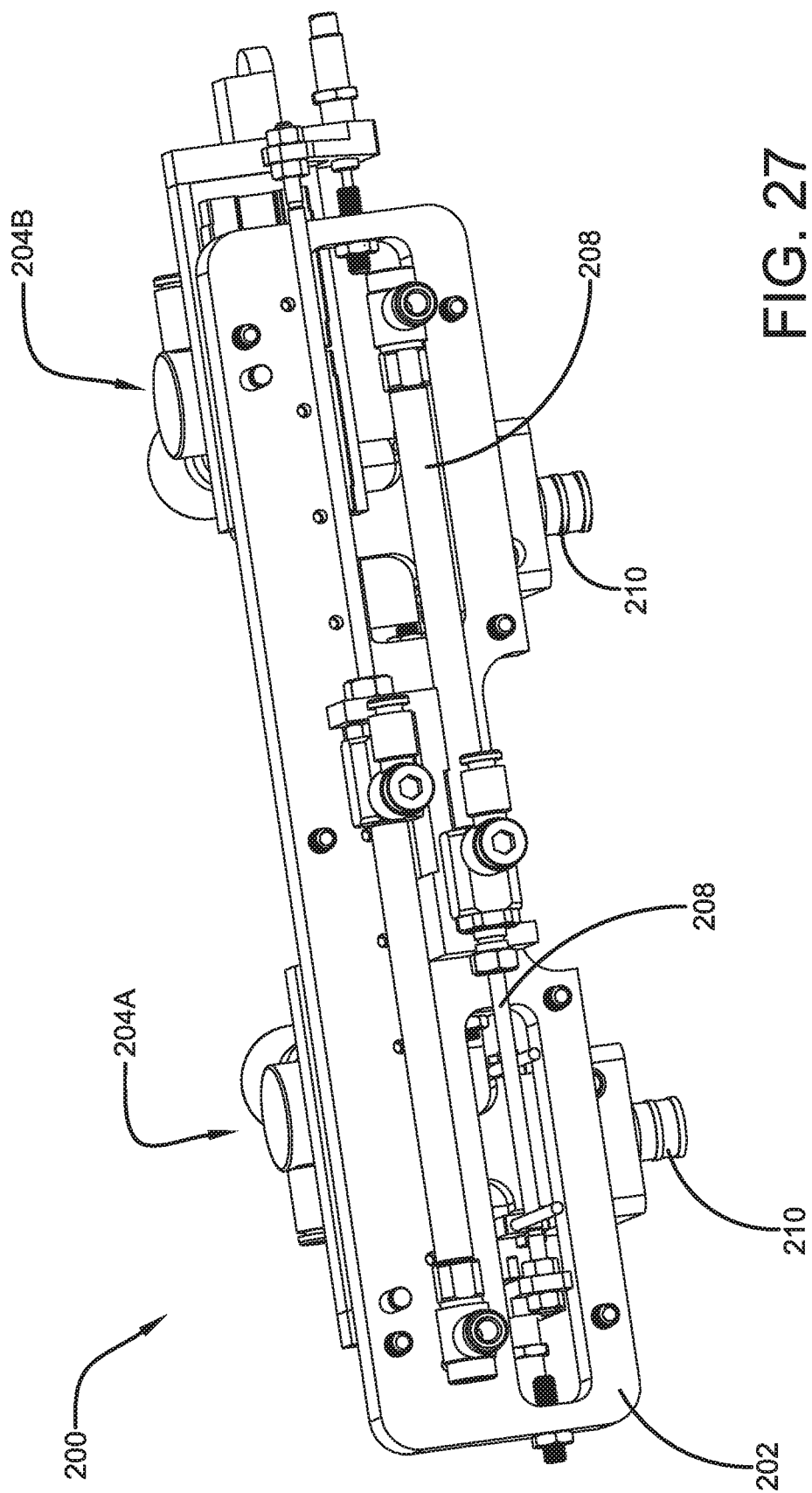
FIG. 27 is a bottom view of the chuck assembly shown in FIG. 25.
Figure 28:
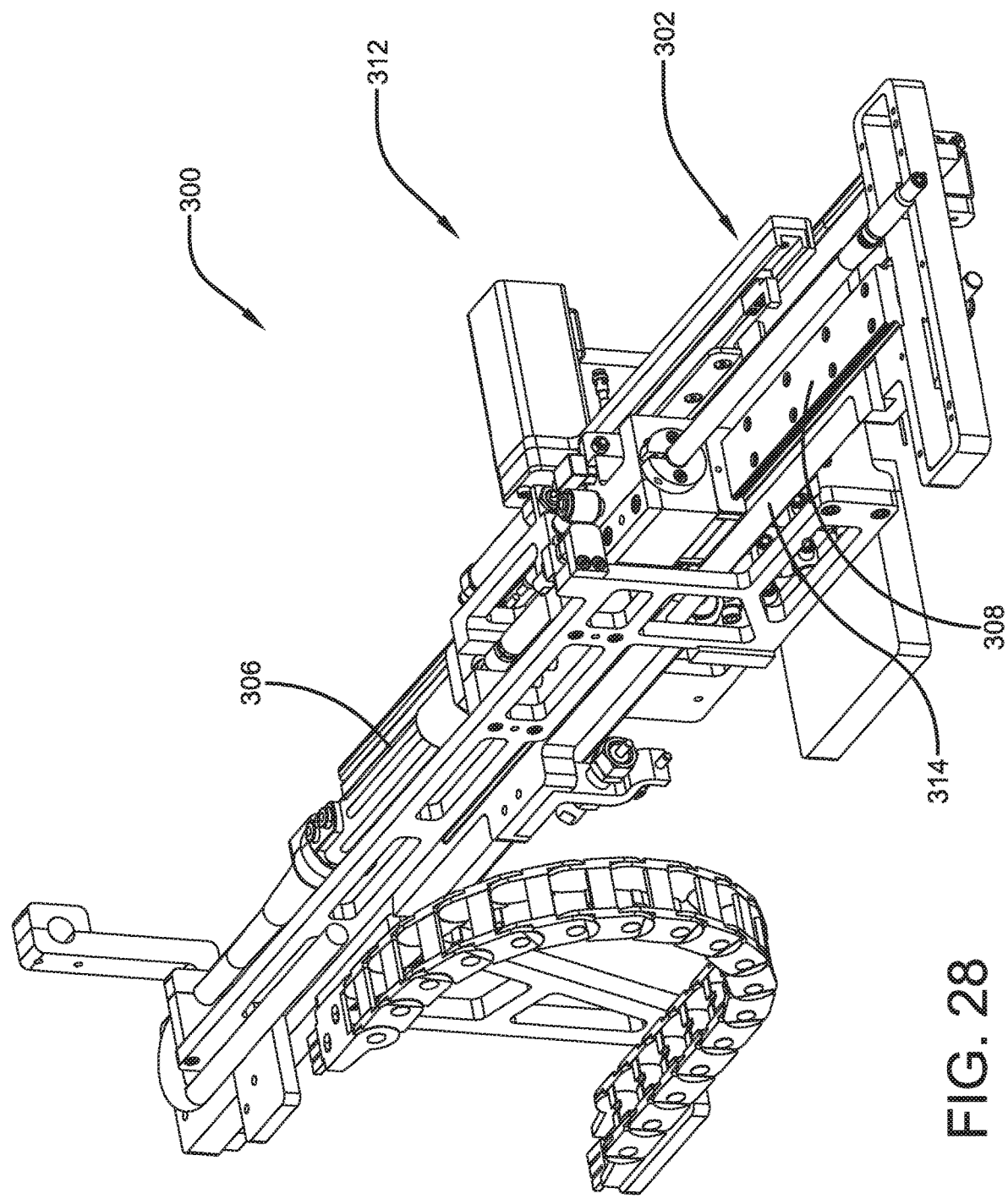
FIG. 28 is a top perspective view of a portion of an automated screw driving machine with components removed for clarity.
Figure 29:
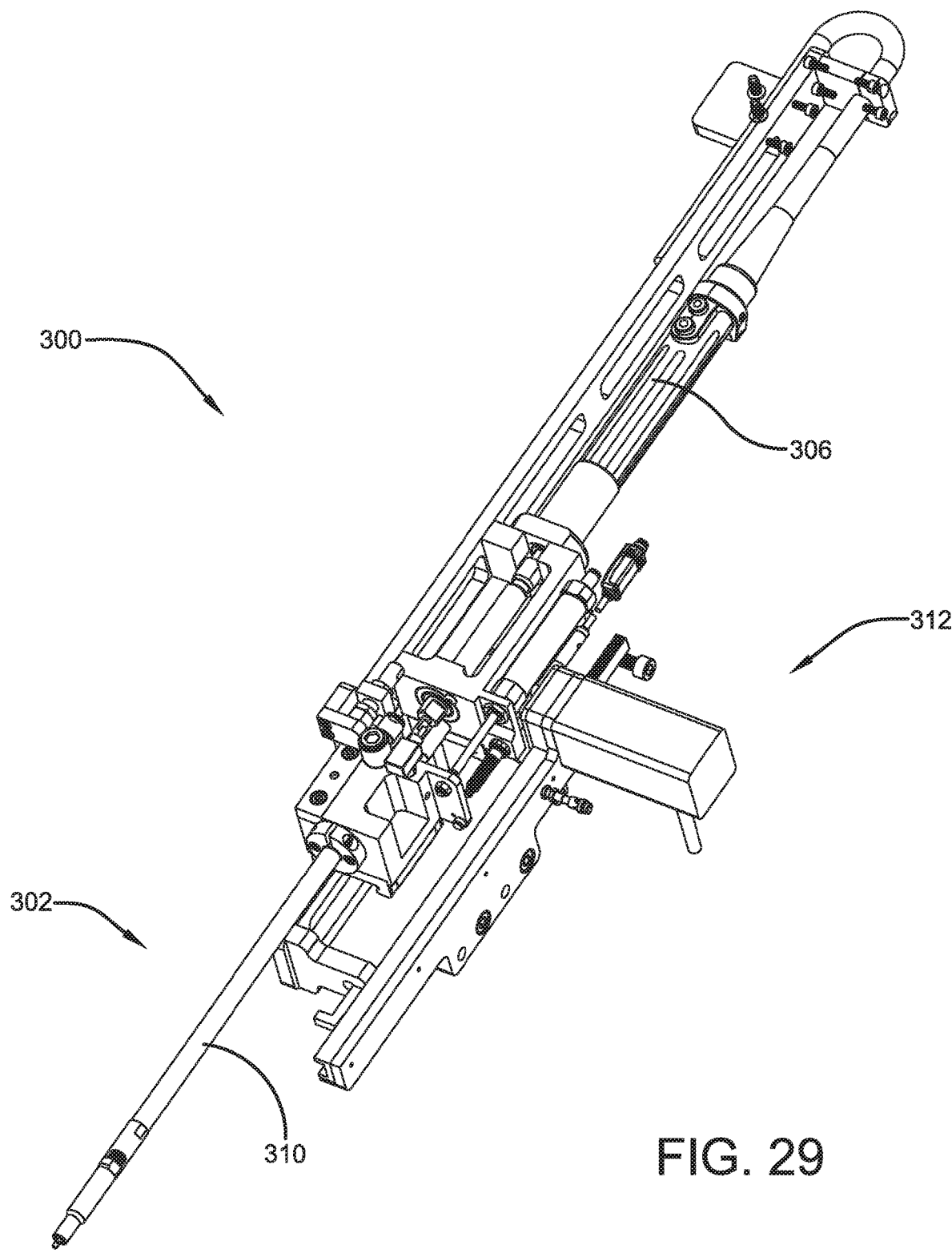
FIG. 29 is a top perspective view of a portion of an automated screw driving machine with components removed for clarity.
Figure 30:
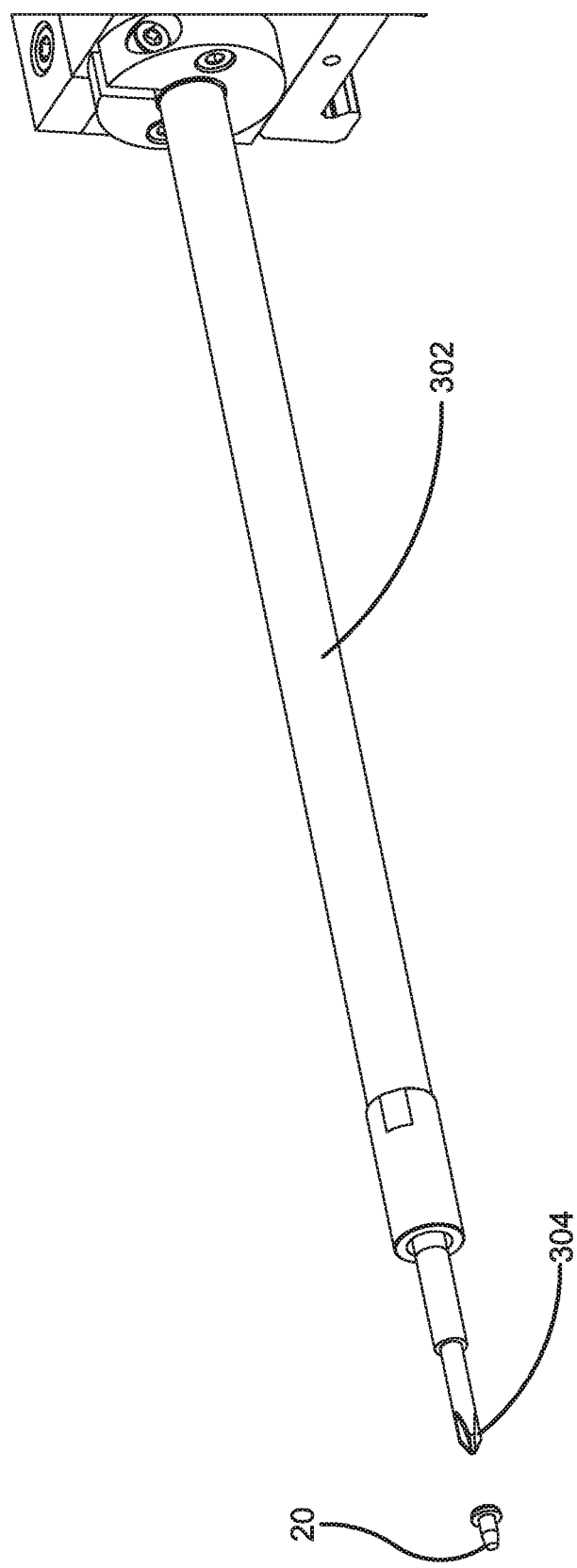
FIG. 30 is a close-up view of a driver.

With reference now to FIGS. 11-14 and 16-23, in operation, when fastener conveyance structure 136 is not needed, it is positioned vertically above the transport surface 108 using force generating device 148 as shown in FIGS. 19-20. When fastener conveyance structure 136 is needed, it can be lowered toward the transport surface 108, using force generating device 148, until the extension 154 of the tab 138 is positioned within groove 120. Tab 138 can then be moved horizontally, using force generating device 152, toward location L2 with extension 154 of tab 138 guiding any fasteners 20 positioned in the groove 120 in that area toward opening 114. Confinement device 142 will prevent any misaligned fasteners 20 from gaining access to opening 114. At the end of the horizontal movement, the fastener conveyance structure 136 attains the position shown in FIG. 23. In this position, the confinement device 142 is positioned in front of opening 114 to provide a final impediment to any misaligned fasteners 20. Simultaneously, tab 140 is positioned just behind opening 114, with its extension 154 positioned within groove 120, to prevent any fasteners 20 from moving beyond opening 114. In this way, each fastener 20 that reaches opening 114 is properly oriented/aligned and ready to be conveyed to the chuck assembly 200. Specifically, under air/vacuum pressure each fastener 20 may pass via a tube or hose connected at inlet 156 (shown in FIG. 22) to one of the inlets 210, 210 shown in FIG. 26 on the chuck assembly 200.

Figure 31:
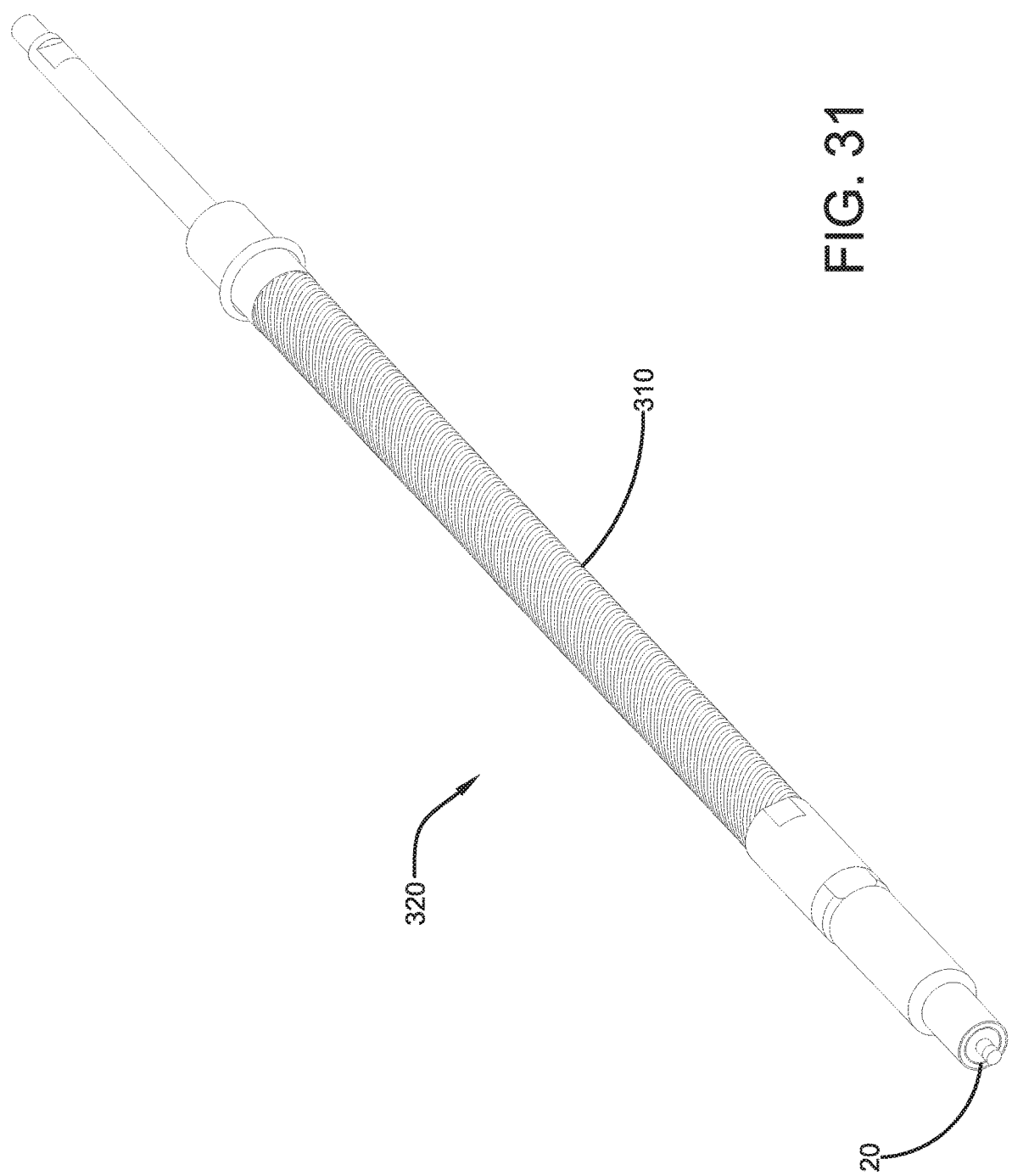
FIG. 31 is a close-up view of a driver having a vacuum tube.
Figure 32:
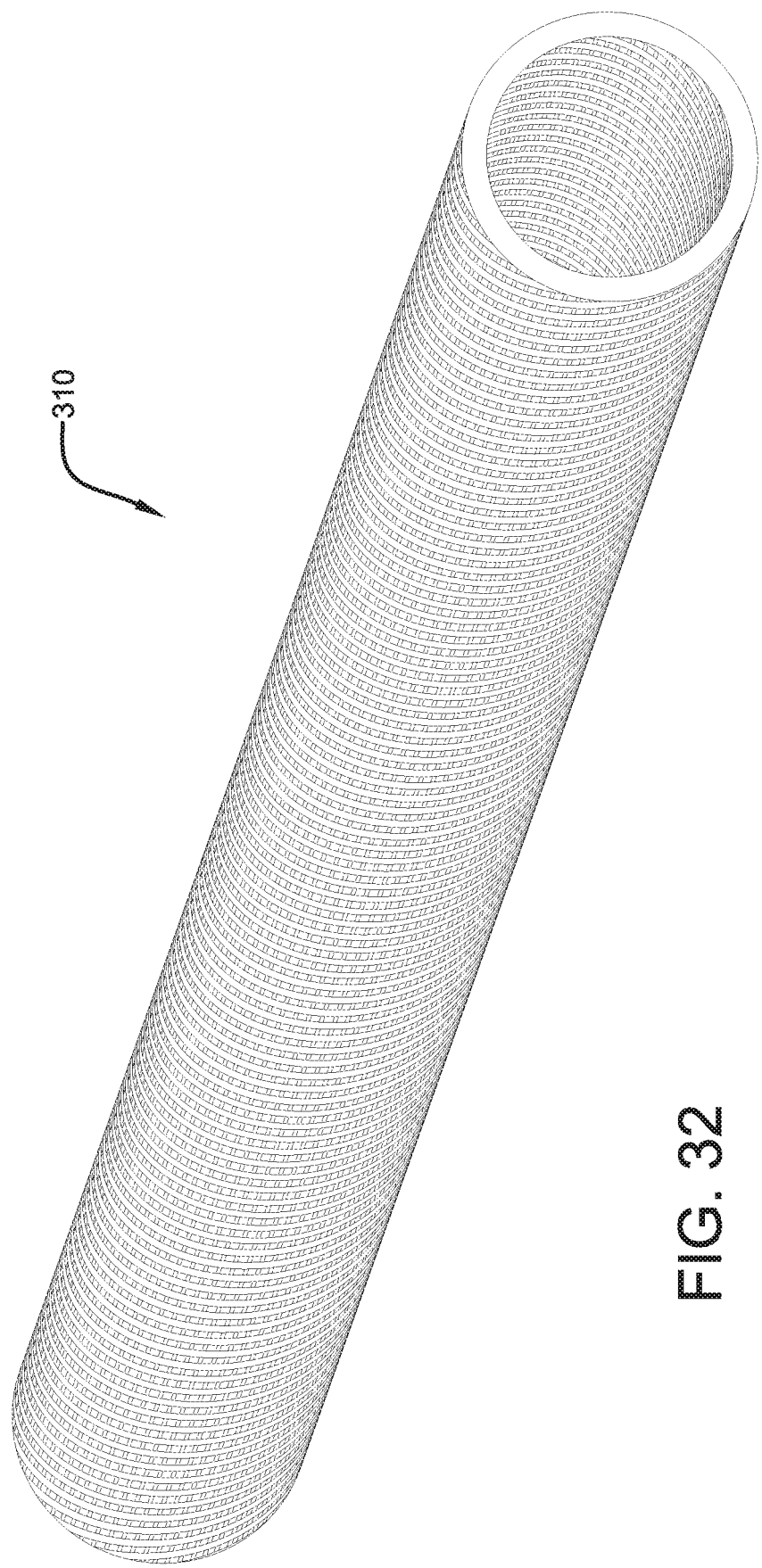
FIG. 32 is a perspective view of the vacuum tube shown in FIG. 31.
Figure 33:
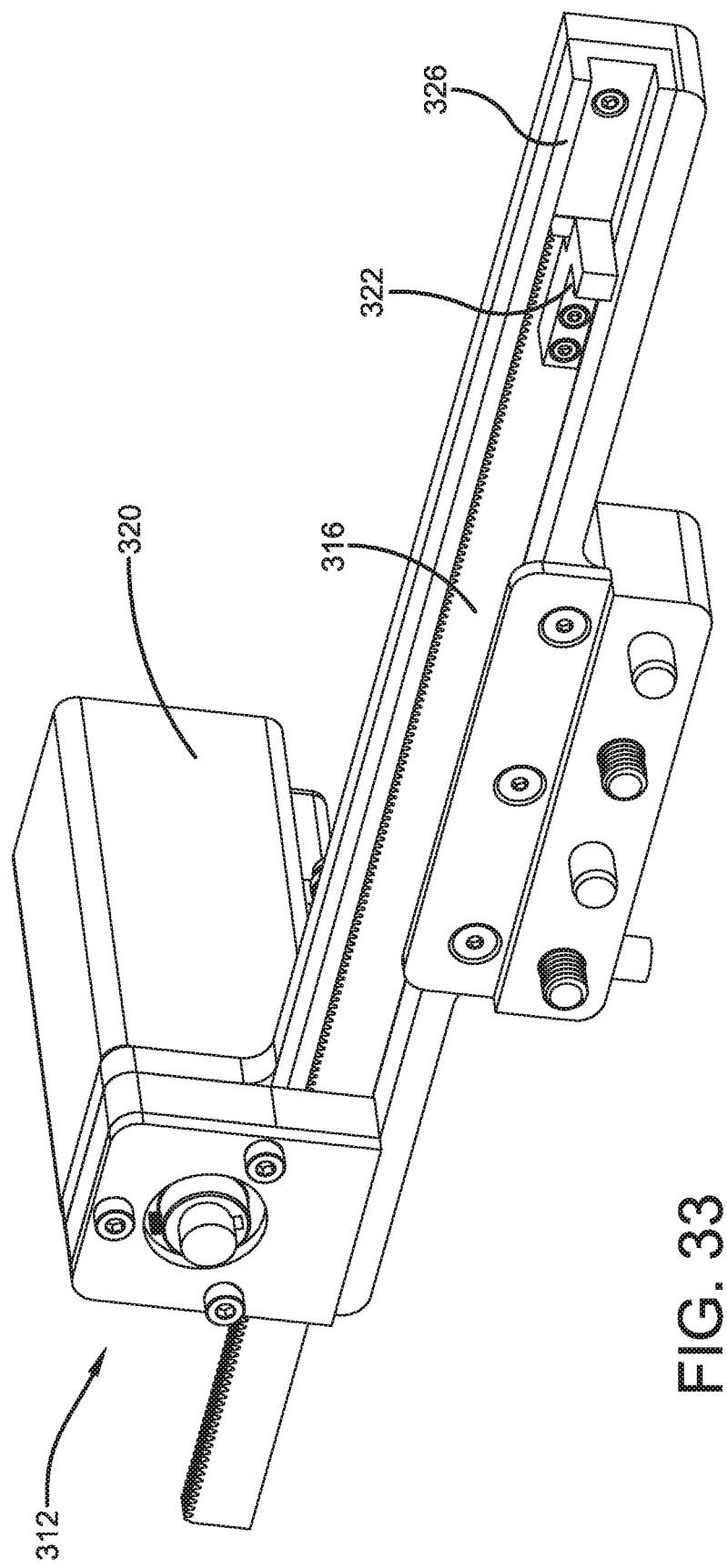
FIG. 33 is a side perspective view of an adjustment module.
Figure 34:
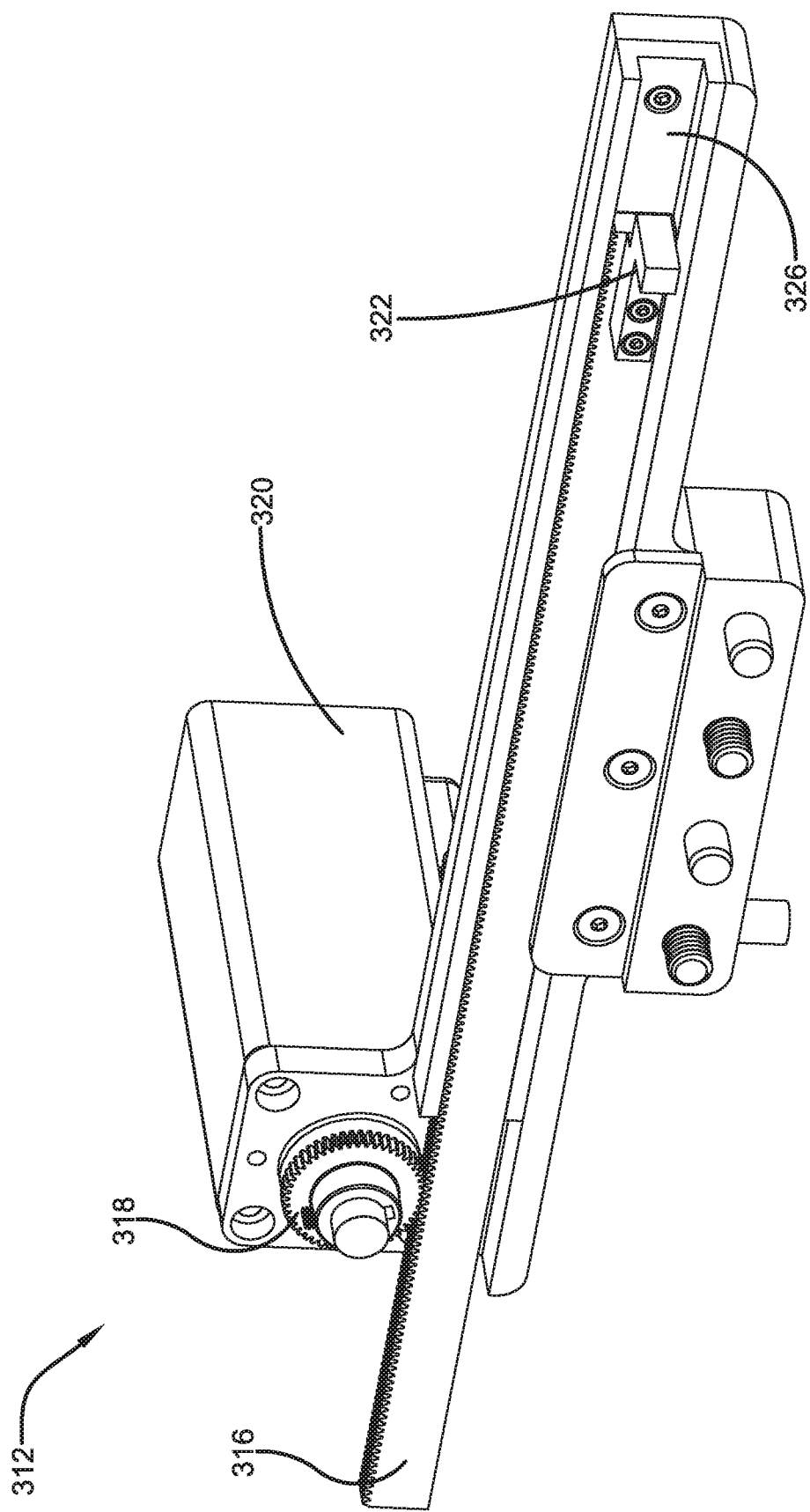
FIG. 34 is a view similar to that shown in FIG. 33 but with the pinion gear visible.
Figure 35:
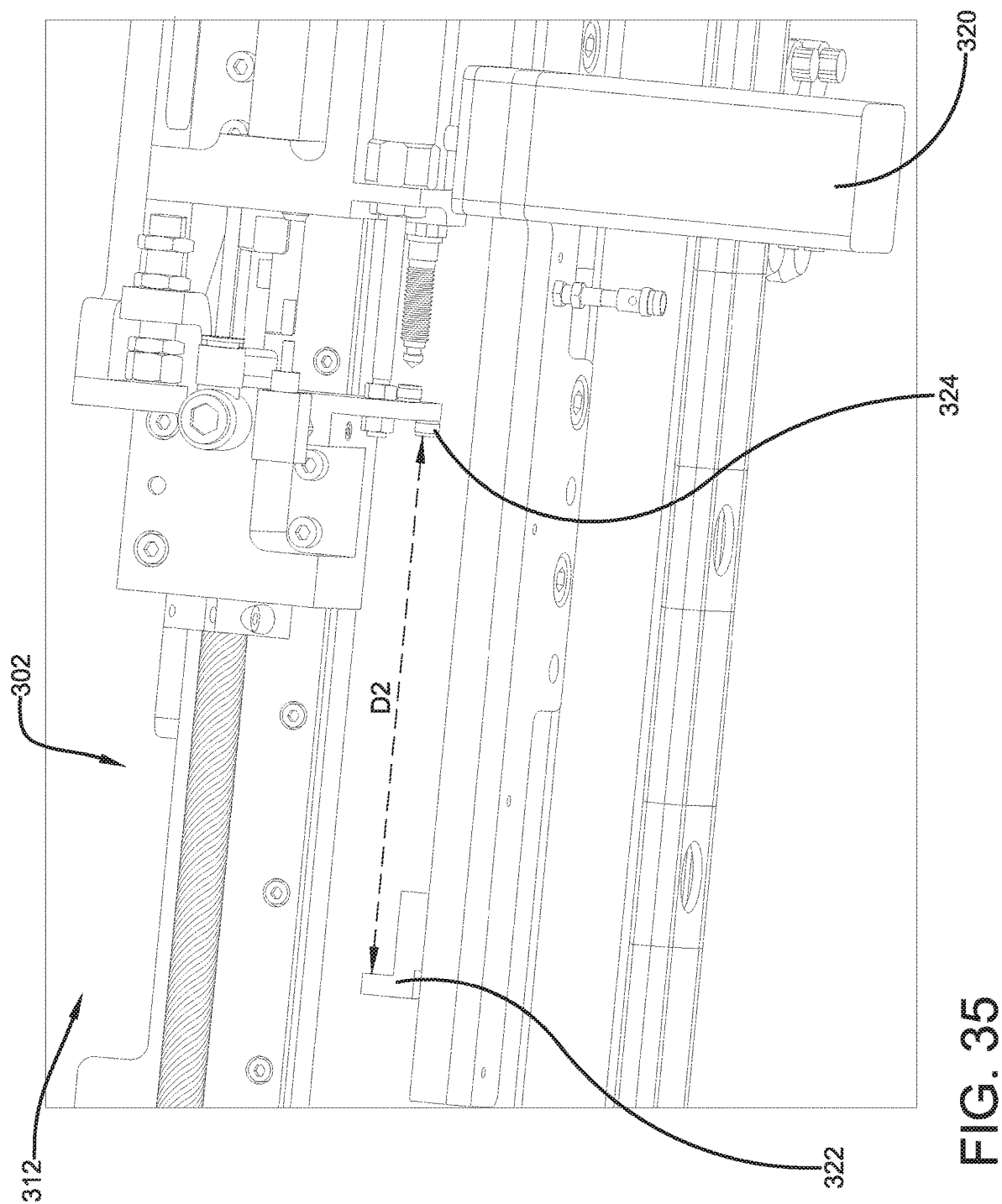
FIG. 35 is a perspective top view of an adjustment module.

With reference now to FIGS. 2 and 24-27, according to some aspects of the present teaching the chuck assembly 200 may be supported to support structure 202. Support structure 202 may then be supported to a floor or ground surface in any manner chosen with the skill of a person of skill in the art. Chuck assembly 200 may include one or more chucks 204. In the example shown, two chucks 204A, 204B, are used and are positioned on opposite sides of the driver assembly 300. Each chuck 204 may slide on a rail 206 toward and away from intersection with the driver assembly 300. A force generating device 208, which may be a pneumatic cylinder, may be used to move each chuck 204 on the rail 206. Each chuck 204 may begin in a load position where a fastener 20 is loaded into the chuck 204. Specifically, a fastener 20 may arrive through inlet 210 into staging member 212. Air/vacuum control valve 214 may be used to confirm the proper alignment of the fastener 20 within staging member 212. When the chuck 204 is in the load position (in alignment with the staging member 212), the fastener 20 may be moved into the chuck's fastener holding member 216. Air/vacuum control valve 218 may be used to confirm the proper alignment of the fastener 20 within the holding member 216. Then, at the appropriate time, the chuck 204 may be moved to the release position (in alignment with driver gap 220) where the fastener 20 is released by the chuck 204 and held by the driver assembly 300. The driver assembly holding the fastener 20 is shown in FIG. 31. If two or more chucks 204 are being used, one may be in the load position while the other is in the release position. In this way, fasteners 20 can be quickly and accurately positioned within each chuck 204 and then quickly and accurately positioned with respect to the driver assembly 300.

With continuing reference to FIGS. 2 and 24-27, while the chucks 204A, 204B shown appear to be identical (though with a mirror image orientation with respect to the driver assembly) it should be noted that this may not be desirable according to some aspects of the present teaching. Chuck 204A, for example, may be designed to receive a particular type and/or size of fastener while chuck 204B may be designed to receive a different type and/or size of fastener. In this way, each chuck 204 can be designed to match the type of fastener it will receive. This also permits the automated screw driving machine 10 to apply different fasteners without requiring shutdown of the machine. It is only necessary to replace a specific chuck while one or more other chucks remain in operation.

With reference now to FIGS. 2, 24 and 28-32, according to some aspects of the present teaching the driver assembly 300 may include at least one driver 302 having a bit 304 designed to engage a particular drive 26 (shown in FIG. 6) of a fastener 20. A driver motor 306 may be used to apply linear and/or torsional forces to the fastener 20 in order to attach the fastener 20 to the part being assembled. The driver 302 and drive motor 306 may be extended toward and away from the part being assembled along a rail 308. A force generating device, which may be a pneumatic cylinder, may be used to move the driver 302 and motor 306 along the rail 308. The rail 308 may be supported to support structure 314. Surrounding the driver 302 may be a vacuum tube 310. Vacuum pressure is used to hold the fastener 20 in place with respect to the driver 302 and bit 304. The vacuum tube 310 may be formed of a carbon fiber.

With reference now to FIGS. 2, 24, 28-29 and 33-35, according to some aspects of the present teaching an adjustment module 312 may be provided. The adjustment module 312 may be used to adjust the stroke length of the driver 302. This may be used, for example, when the particular application requires that no part of the screw driving machine 10 contact the part being assembled. The adjustment module 312 may be supported to the support structure 314. The adjustment module may include a rack gear 316 having gear teeth engaged to the gear teeth of a pinion gear 318 (visible in FIG. 34) and a channel 326 within which the rack gear 316 may slide linearly. A force generating device 320 may be operable to rotate the pinion gear 318 and thereby move the rack gear 316 within the channel 326. The force generating device 320 may be an electric motor. Attached to the rack gear 316 may be a contact surface 322 and attached to the driver 302 may be a contact surface 324. In operation, when the contact surfaces 322, 324 contact each other, forward motion of the driver 302 can be stopped. In this way, the stroke of the driver 302 along the rail 308 is limited by the adjustment module 312. Due to the precise engagement between the rack gear 316 and pinion gear 318, the distance D2 between the contact surfaces 322, 324 can be very accurately set, as required by the particular application, such that the fastener is properly attached to the part being assembled without the automated screw driving machine contacting the part.

Figure 36:
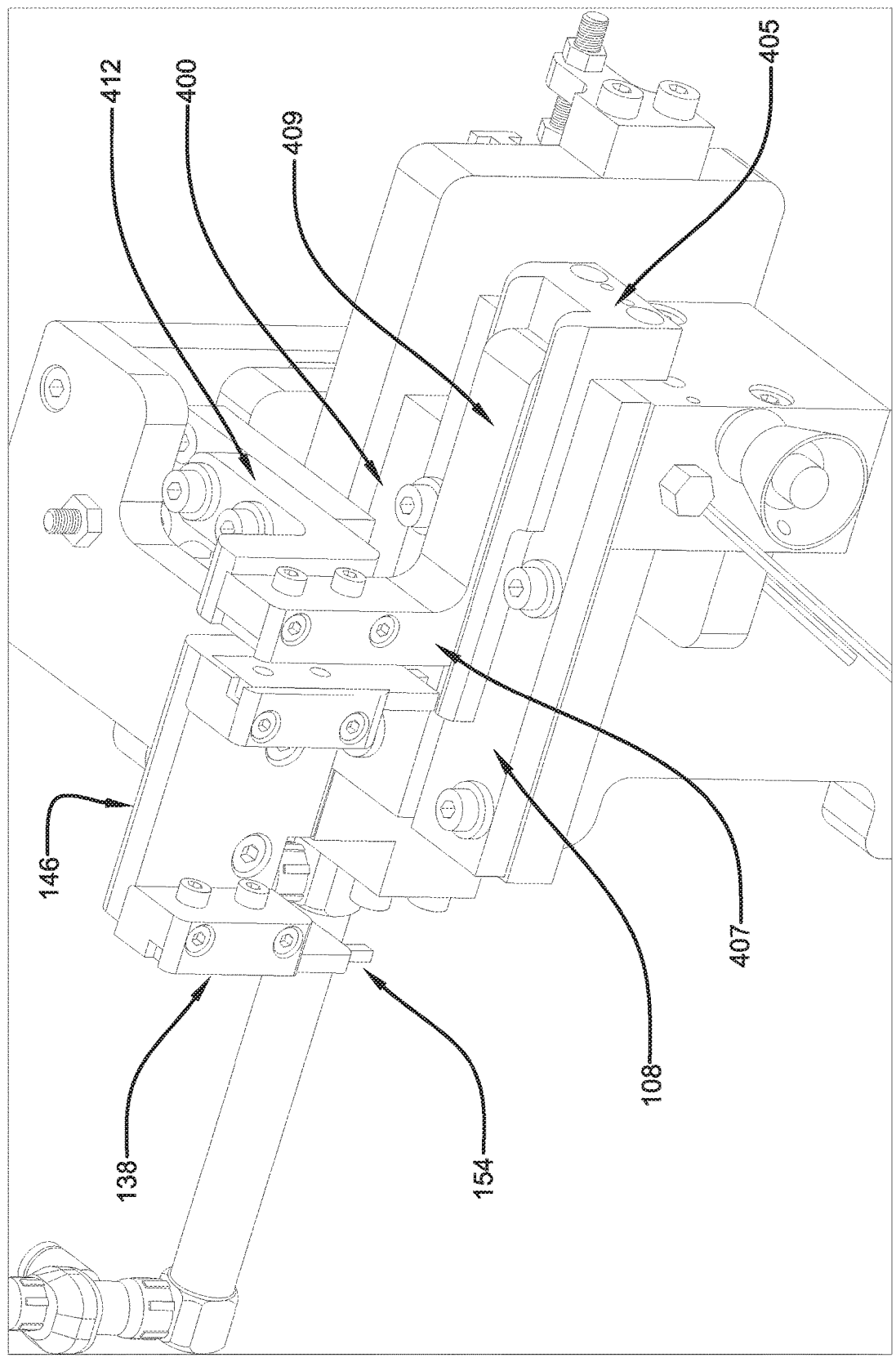
FIG. 36 is a perspective view of a drop point guard.
Figure 37:
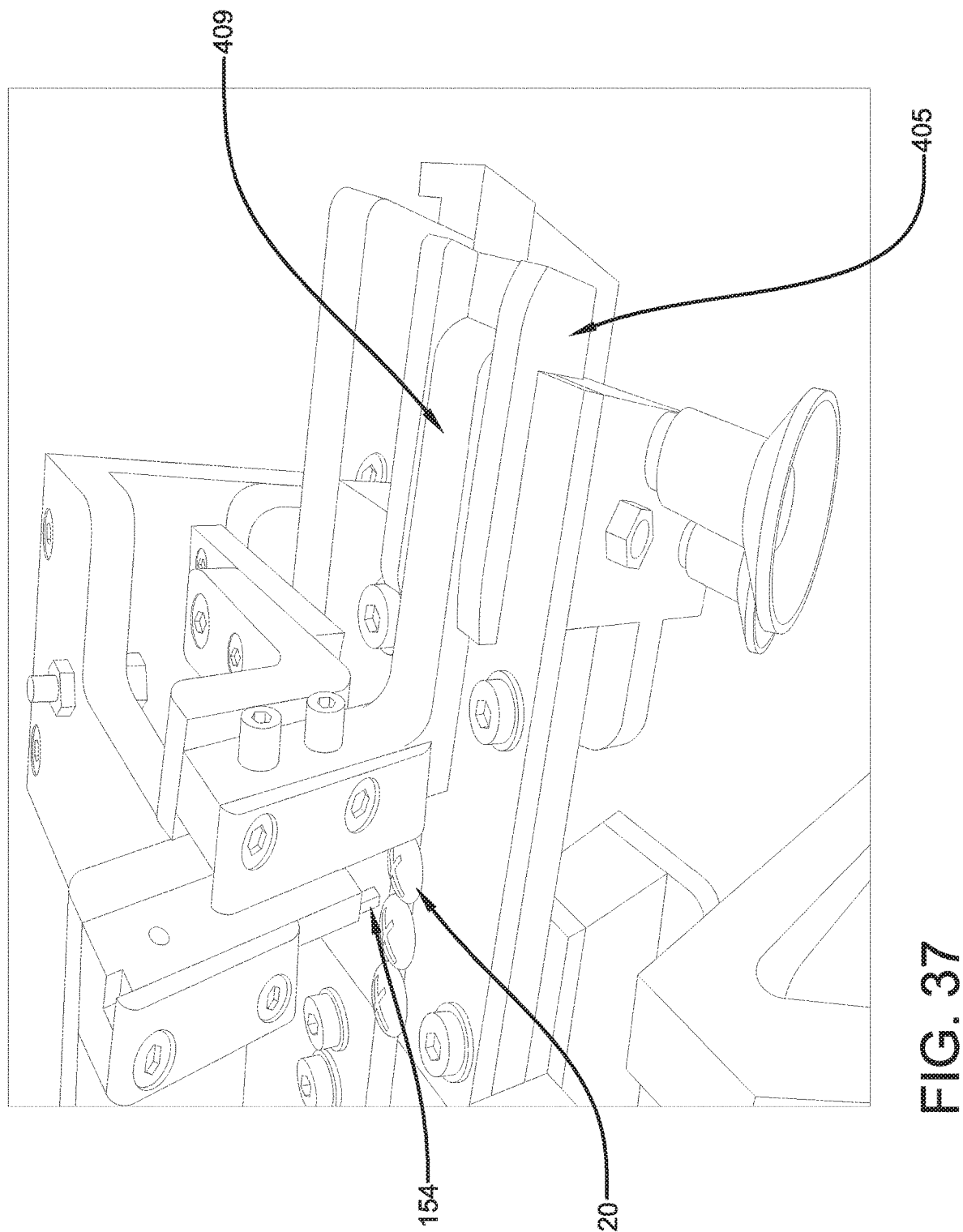
FIG. 37 is a side view similar to that shown in FIG. 36 showing the drop point guard in a first position fully covering the opening.
Figure 38:
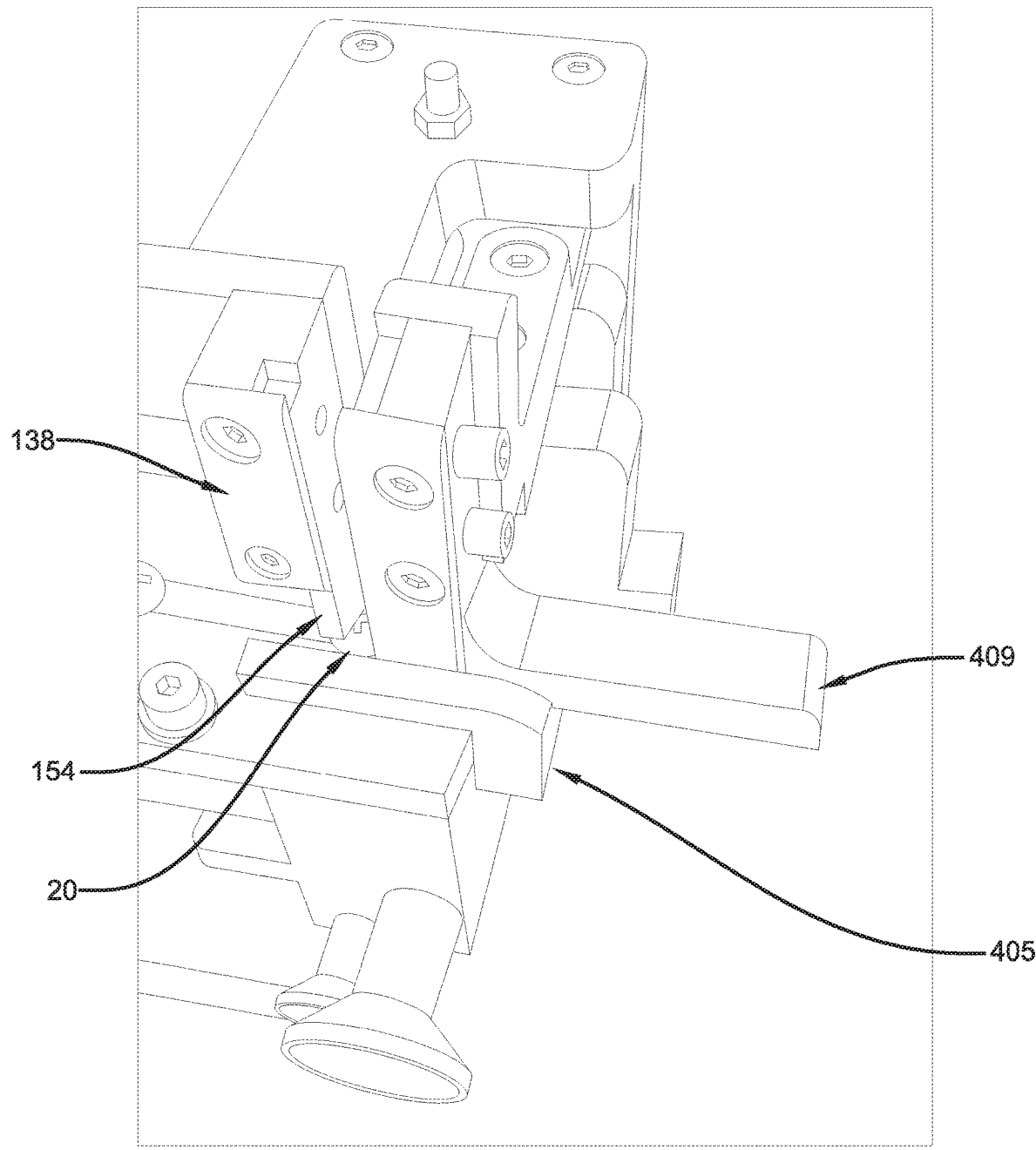
FIG. 38 is a close-up view showing the drop point guard nearing a second position where the opening is nearly fully uncovered with guide extension and tab in an screw engagement position.
Figure 39:
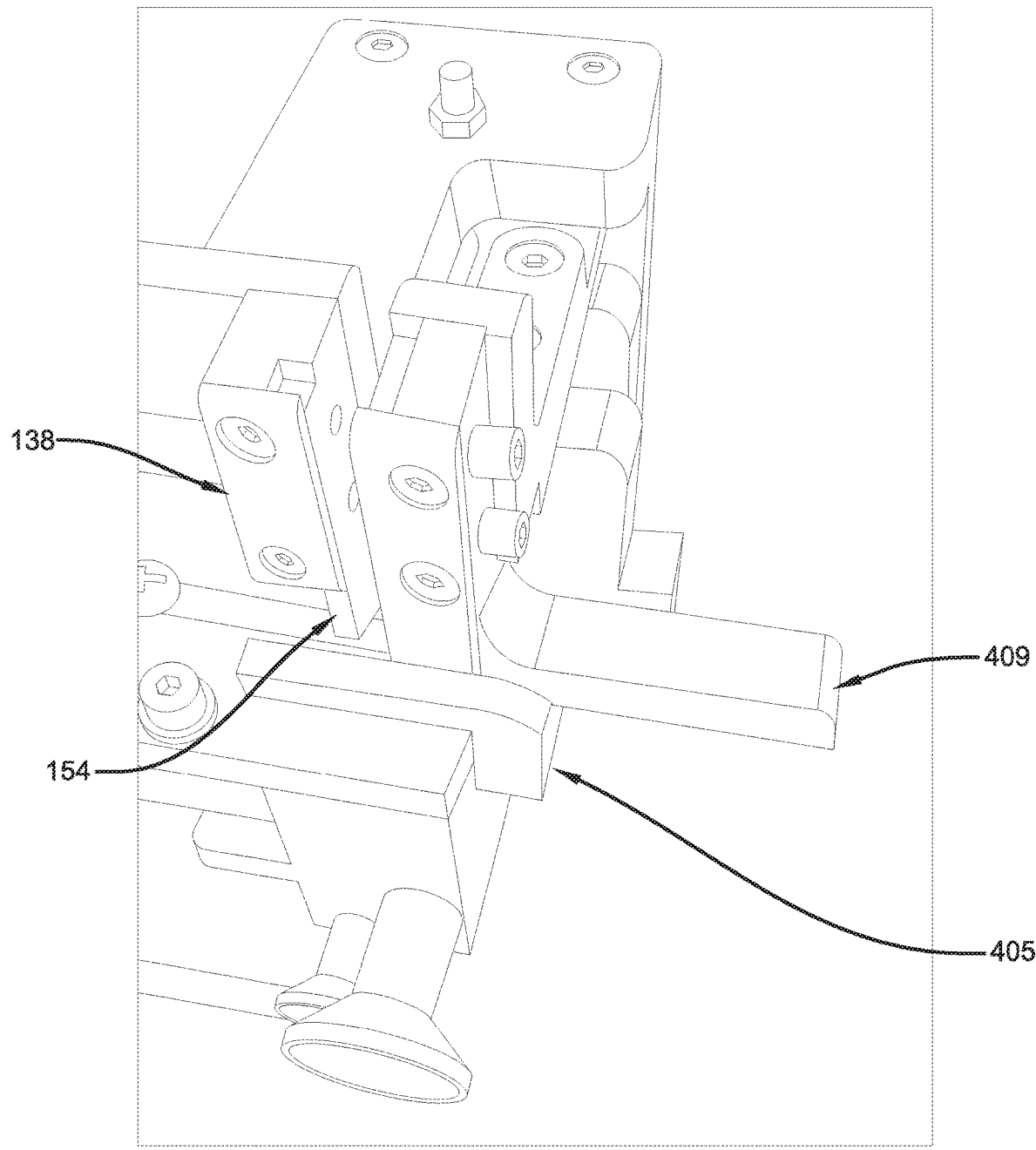
FIG. 39 is a close-up view showing the drop point guard at a second position where the opening is fully uncovered.
Figure 40:
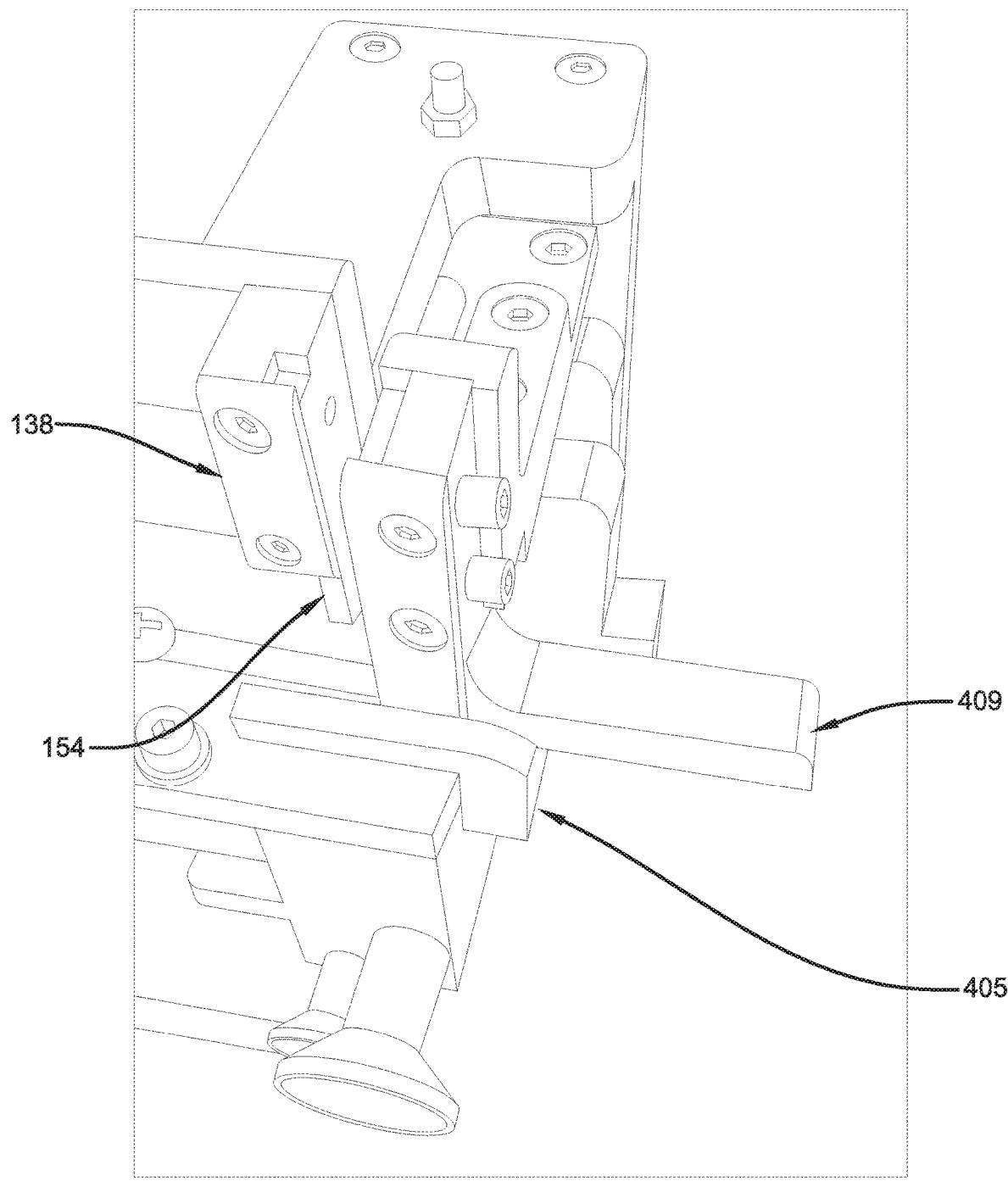
FIG. 40 is a close-up view showing the guard returning to the first position with guide extension and tab in an elevated position.
Figure 41:
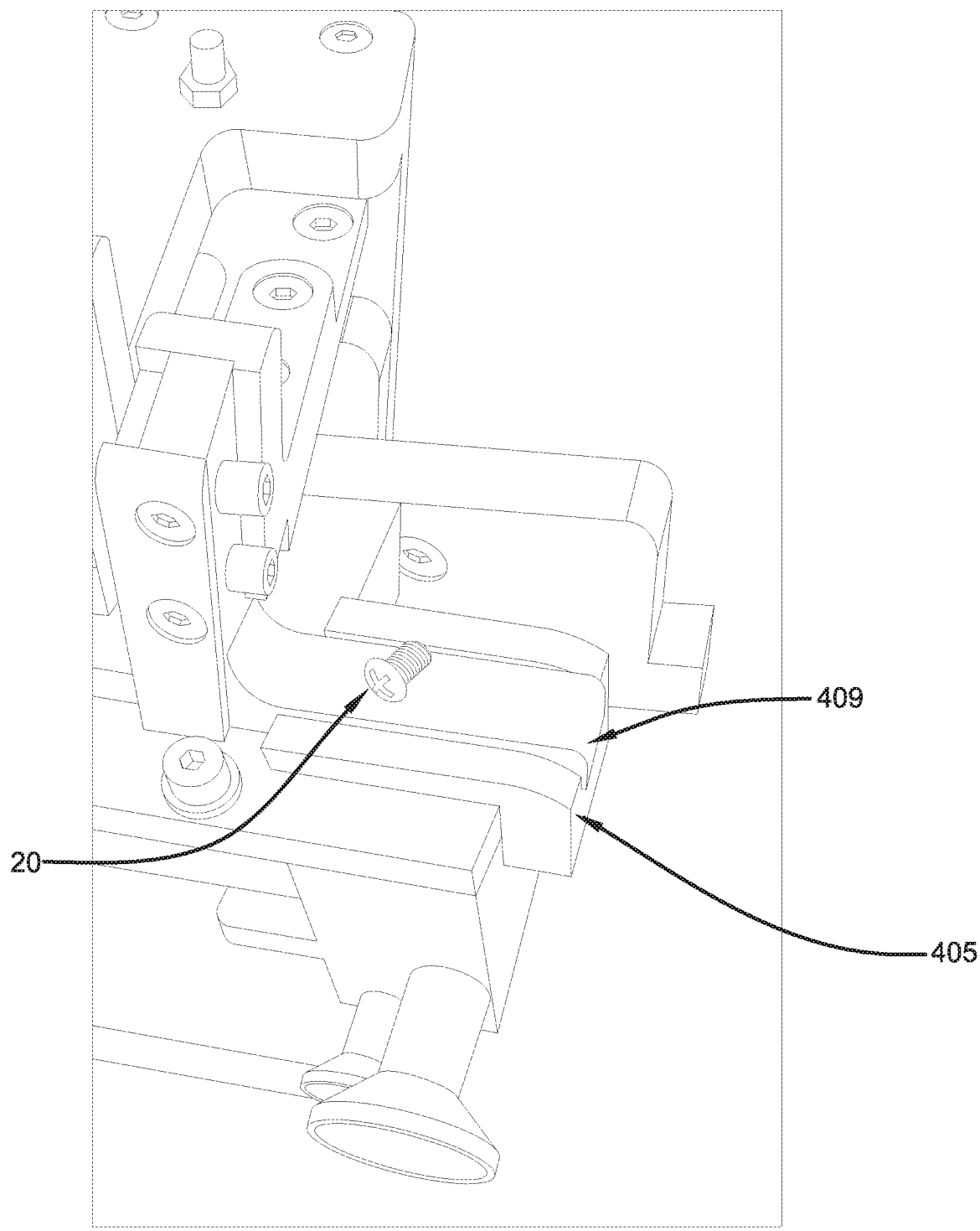
FIG. 41 is a close-up view showing the drop point guard in the first position blocking access to the opening.
Figure 42:
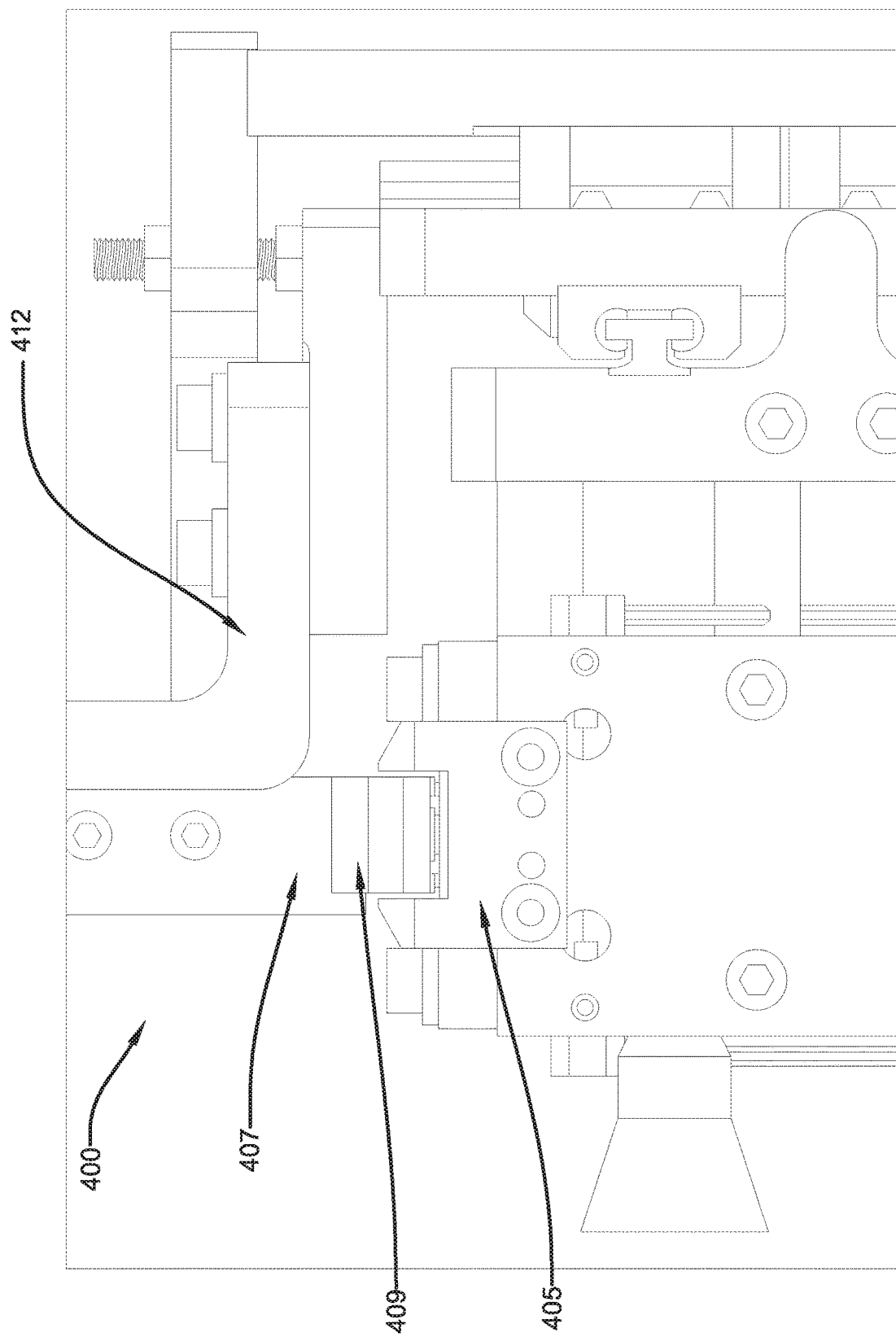
FIG. 42 is a front view of the drop point guard.

With reference now to FIGS. 36-42, according to some aspects of the present teaching a drop point guard 400 may be provided for use with the feeder assembly 100. Drop point guard 400 may comprise an auxiliary channel 405, a cover plate 407 and a cover plate assembly arm 412 attached to the cover plate. Auxiliary channel 405 may be positioned on transport surface 108, around opening 114, to guide cover plate 407 over the opening 114 as described in further detail below. Cover plate 407 may comprise a horizontal member 409 slidably received in the auxiliary channel 405. The horizontal member 409 may be slidable from a first position (as seen in FIG. 37), in which the horizontal member 409 covers opening 114, to a second position in which horizontal member 409 does not cover opening 114 (as in FIG. 39). As shown in FIGS. 38 and 39, when a fastener 20 is transported behind the horizontal member 409 as horizontal member 409 moves from the first position to the second position, the fastener 20 will be transported to the opening in a proper orientation until fastener 20 enters opening 114. However, as shown in FIG. 41, horizontal member 409 prevents fasteners from being dropped onto the feeder assembly over the opening or misfed into the opening 114.

With continuing reference to FIG. 36, horizontal member 409 may be attached to cover plate support arm 412 by any means selected with sound engineering judgment, including, without limitation, a vertical element as shown in the Figures. Cover plate assembly arm 412 may be movable to move the horizontal member 409 from the first position to the second position and back. Movement of the cover plate assembly arm 412 may be achieved by any mechanical, electrical, pneumatic or hydraulic means selected with sound engineering judgment, and may including a force generating device such as pneumatic force generating device discussed above.

With continuing reference to FIGS. 36-40, drop point guard 400 may operate in cooperation with supporting structure 146 and one of the tabs 138, 140 to transport a fastener 20 to the opening 114 as horizontal member 409 travels to the second position. As shown in FIG. 38, a fastener 20 may be captured between the back end of horizontal member 409 and extension 154 of tab 138, which has been lowered to position extension 154 into groove 120. As horizontal member 409 moves to the second position, extension 154 of tab 138 may independently or dependently travel behind the horizontal member 409, moving the fastener 20 to the opening. In FIG. 38, fastener 20 is shown just before dropping in opening 114. In FIG. 39, fastener 20 has dropped into opening 114. In FIG. 40, tab 138 has been moved vertically to remove extension 154 from the groove 120 so that the horizontal member and tab 138 can travel back to the first position, where tab 138 can be lowered again to trap and transport a new fastener 20 to opening 114.

While the automated screw driving machine has been described above in connection with various illustrative embodiments, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the automated screw driving machine should not be limited to any single embodiment, but rather construed in breadth and scope in accordance with the recitations of the appended claims.

I claim:

1. An automated screw driving machine comprising:
a hopper adapted to hold a plurality of fasteners;
a chuck assembly adapted to hold an individual fastener from the plurality of fasteners in position with respect to an associated component part, the chuck assembly having a support structure defining a driver gap between a first end and a second opposing end on the support structure, at least one chuck linearly moveable on the support structure between the first end and the driver gap, and at least one staging member fixed at the first end and defining an inlet opening;

a feeder assembly comprising a conveyer and operably engaging the hopper and the chuck assembly, wherein the feeder assembly is adapted to convey the fasteners from the hopper to the chuck assembly; and a driver assembly operably engaging each fastener from the plurality of fasteners received from the chuck assembly and attaching each fastener to the associated component part, the driver assembly having at least one driver including a driver bit.

2. The automated screw driving machine of claim 1, wherein the at least one staging member defines the inlet opening that operably connects the chuck assembly to the feeder assembly for receiving fasteners from the hopper and the feeder assembly.

3. The automated screw driving machine of claim 1, wherein the chuck assembly further comprises:

a first air/vacuum control valve provided on the at least one staging member, wherein the first air/vacuum control valve is operable for confirming a predetermined alignment of the individual fastener prior to being loaded into the at least first chuck.

4. The automated screw driving machine of claim 1, wherein the chuck assembly further comprises:

a second air/vacuum control valve that is operable for confirming a predetermined alignment of the individual fastener prior to being released to the driver assembly.

5. The automated screw driving machine of claim 1, wherein the chuck assembly further comprises:

a second chuck disposed opposite to the at least one chuck on the support structure and is linearly moveable on the support structure between the second end and the driver gap; and a second staging member defining a second inlet opening, wherein the second staging member is disposed opposite to the at least one staging member on the support structure and is fixed at the second end.

6. The automated screw driving machine of claim 5, wherein the at least one chuck and the second chuck are linearly moveable along a rail provided between the first end and the second end on the support structure via a cylinder.

7. The automated screw driving machine of claim 5, wherein one of the at least one chuck and the second chuck are provided in a loading position, and when in the loading position, one of the at least one chuck and the second chuck is receiving an individual fastener from the feeder assembly.

8. The automated screw driving machine of claim 5, wherein one of the at least one chuck and the second chuck are provided in a releasing position, and when in the releasing position, one of the at least one chuck and the second chuck is releasing an individual fastener to the driver assembly.

9. The automated screw driving machine of claim 5, wherein the at least one chuck and the second chuck are adapted to receive and load same types of fasteners to the driver assembly.

10. The automated screw driving machine of claim 5, wherein the at least one chuck and the second chuck are adapted to receive and load different types of fasteners to the driver assembly.

11. The automated screw driving machine of claim 5, wherein the at least one driver passes through the driver gap of the support structure to obtain an individual fastener from one of the at least one chuck and the second chuck.

12. The automated screw driving machine of claim 1, wherein the at least one driver passes through the driver gap of the support structure to obtain an individual fastener from the at least one chuck via the driving bit.

13. The automated screw driving machine of claim 1, wherein the driver assembly further comprises:

a driver motor operably connected to the at least one driver for applying linear and torsional forces to the driving bit of the at least one driver.

14. The automated screw driving machine of claim 13, wherein the driver assembly further comprises:

a driver support structure having a rail; and wherein the at least one driver and driver motor are linearly moveable along the rail of the driver assembly toward and away from the associated component part.

15. The automated screw driving machine of claim 1, wherein the at least one driver is surrounded by a vacuum tube for holding a fastener in place with respect to the at least one driver and the driving bit.

16. The automated screw driving machine of claim 15, wherein the vacuum tube of the driver assembly is formed of carbon fiber.

17. The automated screw driving machine of claim 1, wherein the driver assembly further comprises:

an adjustment module having a rack gear operably engaged to a pinion gear, wherein the adjustment module is operably connected to the at least one driver for adjusting the stroke length of the at least one driver.

18. An automated screw driving machine comprising:

a hopper adapted to hold a plurality of fasteners;

a chuck assembly adapted to hold an individual fastener from the plurality of fasteners in position with respect to an associated component part, the chuck assembly having a support structure defining a driver gap between a first end and a second opposing end on the support structure, a first chuck linearly moveable on the support structure between the first end and the driver gap, a second chuck linearly moveable between the second end and the driver gap, a first staging member fixed at the first end and defining a first inlet opening, and a second staging member fixed at the second end and defining a second inlet opening;

a feeder assembly comprising a conveyer and operably engaging the hopper and the chuck assembly, wherein the feeder assembly is adapted to convey the fasteners from the hopper to the chuck assembly; and a driver assembly operably engaging each fastener from the plurality of fasteners received from the chuck assembly and attaching each fastener to the associated component part, the driver assembly having at least one driver including a driver bit.

\* \* \* \* \*